United States Patent
Cai

(10) Patent No.: US 9,992,554 B2
(45) Date of Patent: Jun. 5, 2018

(54) INTERPOLATED VIDEO TAGGING

(71) Applicant: Google Inc., Mountain View, CA (US)

(72) Inventor: Haoxuan Cai, London (GB)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 15/076,136

(22) Filed: Mar. 21, 2016

(65) Prior Publication Data

US 2016/0205446 A1    Jul. 14, 2016

Related U.S. Application Data

(63) Continuation of application No. 13/847,947, filed on Mar. 20, 2013, now Pat. No. 9,294,712.

(51) Int. Cl.
| | |
|---|---|
| H04N 21/81 | (2011.01) |
| H04N 21/234 | (2011.01) |
| H04N 21/858 | (2011.01) |
| H04N 21/44 | (2011.01) |
| H04N 21/4725 | (2011.01) |
| H04N 7/025 | (2006.01) |
| H04N 21/439 | (2011.01) |
| H04N 21/4722 | (2011.01) |
| G06F 17/30 | (2006.01) |

(52) U.S. Cl.
CPC ..... *H04N 21/8133* (2013.01); *G06F 17/3079* (2013.01); *H04N 7/025* (2013.01); *H04N 21/23418* (2013.01); *H04N 21/4394* (2013.01); *H04N 21/44008* (2013.01); *H04N 21/4722* (2013.01); *H04N 21/4725* (2013.01); *H04N 21/8583* (2013.01)

(58) Field of Classification Search
None
See application file for complete search history.

(56) References Cited

U.S. PATENT DOCUMENTS

| | | | |
|---|---|---|---|
| 6,421,384 B1 * | 7/2002 | Chung | ................. H04N 5/145 |
| | | | 348/E5.066 |
| 6,724,915 B1 * | 4/2004 | Toklu | ..................... G06T 7/248 |
| | | | 382/103 |
| 7,561,723 B2 | 7/2009 | Goldberg et al. | |

(Continued)

FOREIGN PATENT DOCUMENTS

CN    101506828 A    8/2009

OTHER PUBLICATIONS

International Search Report and Written Opinion of International application No. PCT/US2014/022694, dated Jul. 30, 2014, 10 pages.

(Continued)

*Primary Examiner* — Kaitlin A Retallick

(74) *Attorney, Agent, or Firm* — Shumaker & Sieffert, P.A.

(57) ABSTRACT

Interpolated video tagging techniques are described. An example method includes identifying, a sequence of video frames included in a plurality of video frames of a video, where an object exists in at least one video frame of the sequence of video frames, determining an interpolation function associated with the existence of the object in the sequence of video frames, where the interpolation function specifies a time domain of the video in which the interpolation function is valid, and transmitting the video, an indication of the object, and an indication of the interpolation function.

18 Claims, 8 Drawing Sheets

(56) References Cited

U.S. PATENT DOCUMENTS

| | | | |
|---|---|---|---|
| 7,881,505 B2 | 2/2011 | Schneiderman et al. | |
| 8,037,496 B1 | 10/2011 | Begeja et al. | |
| 8,204,273 B2 | 6/2012 | Chambers et al. | |
| 2003/0086490 A1 | 5/2003 | Hori et al. | |
| 2003/0086491 A1* | 5/2003 | Hori | G06T 7/20 375/240.08 |
| 2003/0108099 A1* | 6/2003 | Nagumo | G06T 9/20 375/240 |
| 2003/0194151 A1* | 10/2003 | Wang | G06T 3/4007 382/300 |
| 2006/0104487 A1 | 5/2006 | Porter et al. | |
| 2008/0285940 A1 | 11/2008 | Kulas | |
| 2009/0141940 A1* | 6/2009 | Zhao | G06K 9/00295 382/103 |
| 2010/0002070 A1* | 1/2010 | Ahiska | G08B 13/19691 348/36 |
| 2010/0054694 A1* | 3/2010 | Liu | G11B 27/034 386/285 |
| 2010/0332527 A1* | 12/2010 | Wang | G06F 17/30781 707/769 |
| 2011/0170749 A1 | 7/2011 | Schneiderman et al. | |
| 2012/0167145 A1 | 6/2012 | Incorvia | |
| 2012/0198496 A1* | 8/2012 | Yuan | H04N 21/4725 725/40 |
| 2012/0239690 A1 | 9/2012 | Asikainen et al. | |
| 2012/0307155 A1 | 12/2012 | Gleicher et al. | |
| 2013/0033419 A1* | 2/2013 | Dror | G06T 7/12 345/156 |
| 2014/0285717 A1 | 9/2014 | Cai | |

OTHER PUBLICATIONS

International Preliminary Report on Patentability from International Application No. PCT/US2014/022694, dated Oct. 1, 2015, 7 pages.

Prosecution History from U.S. Appl. No. 13/847,947 from Apr. 21, 2015 through Nov. 13, 2015 98 pgs.

First Office Action, and translation thereof, from counterpart Chinese Application No. 201480016856.6, dated Sep. 5, 2017, 13 pages.

The Notification to Grant, and translation thereof, from counterpart Chinese Application No. 201480016856.6, dated Feb. 6, 2018, 10 pp.

* cited by examiner

INTERPOLATED VIDEO TAGGING

This application is a Continuation of application Ser. No. 13/847,947, filed on Mar. 20, 2013, the entire content of which is hereby incorporated by reference.

BACKGROUND

A variety of devices, such as desktop and laptop computers, tablet computers, mobile phones, and televisions, may be capable of playing video data. Such devices may obtain the video data by various means, such as via Internet download, Internet streaming, or through removable media. In examples, the same device displaying the video data may also be capable of outputting other data that is relevant to a video.

SUMMARY

In one example, a method includes identifying, by a computing device, a sequence of video frames included in a plurality of video frames of a video, where an object exists in at least one video frame of the sequence of video frames, determining, by the computing device, an interpolation function associated with the existence of the object in the sequence of video frames, where the interpolation function specifies a time domain of the video in which the interpolation function is valid, and transmitting, by the computing device, the video, an indication of the object, and an indication of the interpolation function.

In another example, a device includes a memory, and one or more programmable processors configured to identify a sequence of video frames included in a plurality of video frames of a video, where an object exists in at least one video frame of the sequence of video frames, and determine an interpolation function associated with the existence of the object in the sequence of video frames, where the interpolation function specifies a time domain of the video in which the interpolation function is valid. The device further includes an interface configured to transmit the video, an indication of the object, and an indication of the interpolation function.

In another example, a computer-readable storage device is encoded with instructions that, when executed, cause one or more programmable processors of a computing device to identify a sequence of video frames included in a plurality of video frames of a video, where an object exists in at least one video frame of the sequence of video frames, to determine an interpolation function associated with the existence of the object in the sequence of video frames, where the interpolation function specifies a time domain of the video in which the interpolation function is valid, and to transmit the video, an indication of the object, and an indication of the interpolation function.

In another example, a method includes receiving, by a computing device, a video that includes a plurality of video frames, an indication of at least one object represented in the video, a tag associated with the object, an interpolation function associated with the object for at least one sequence of video frames of the video, and knowledge data associated with the object, wherein the interpolation function specifies a time domain of the video in which the interpolation function is valid, determining, by the computing device and for a video frame of the video, a position in the video frame for the tag associated with the object, based on the received interpolation function, wherein the tag is associated with the knowledge data associated with the object, and outputting for display, by the computing device, at least one of the video frame and the tag positioned according to the determined position.

In another example, a device includes a memory, and an interface configured to receive a video that includes a plurality of video frames, an indication of at least one object represented in the video, an indication of an interpolation function associated with the object for at least one sequence of video frames of the video, and knowledge data associated with the object, wherein the interpolation function specifies a time domain of the video in which the interpolation function is valid. The device further includes one or more programmable processors configured to determine, for a video frame of the video, a position in the video frame at which to display a tag associated with the object, based on the received interpolation function, wherein the tag is associated with the knowledge data associated with the object, and output, for display, at least one of the video frame and the tag positioned according to the determined position.

In another example, a computer-readable device is encoded with instructions that, when executed, cause one or more programmable processors of a computing device to receive a video that includes a plurality of video frames, an indication of at least one object represented in the video, an indication of an interpolation function associated with the object for at least one sequence of video frames of the video, and knowledge data associated with the object, wherein the interpolation function specifies a time domain of the video in which the interpolation function is valid, determine, for a video frame of the video, a position in the video frame at which to display a tag associated with the object, based on the received interpolation function, wherein the tag is associated with the knowledge data associated with the object, and output, for display, at least one of the video frame and the tag positioned according to the determined position.

The details of one or more examples of the disclosure are set forth in the accompanying drawings and the description below. Other features, objects, and advantages will be apparent from the description and drawings, and from the claims.

DETAILED DESCRIPTION

Figure 1:
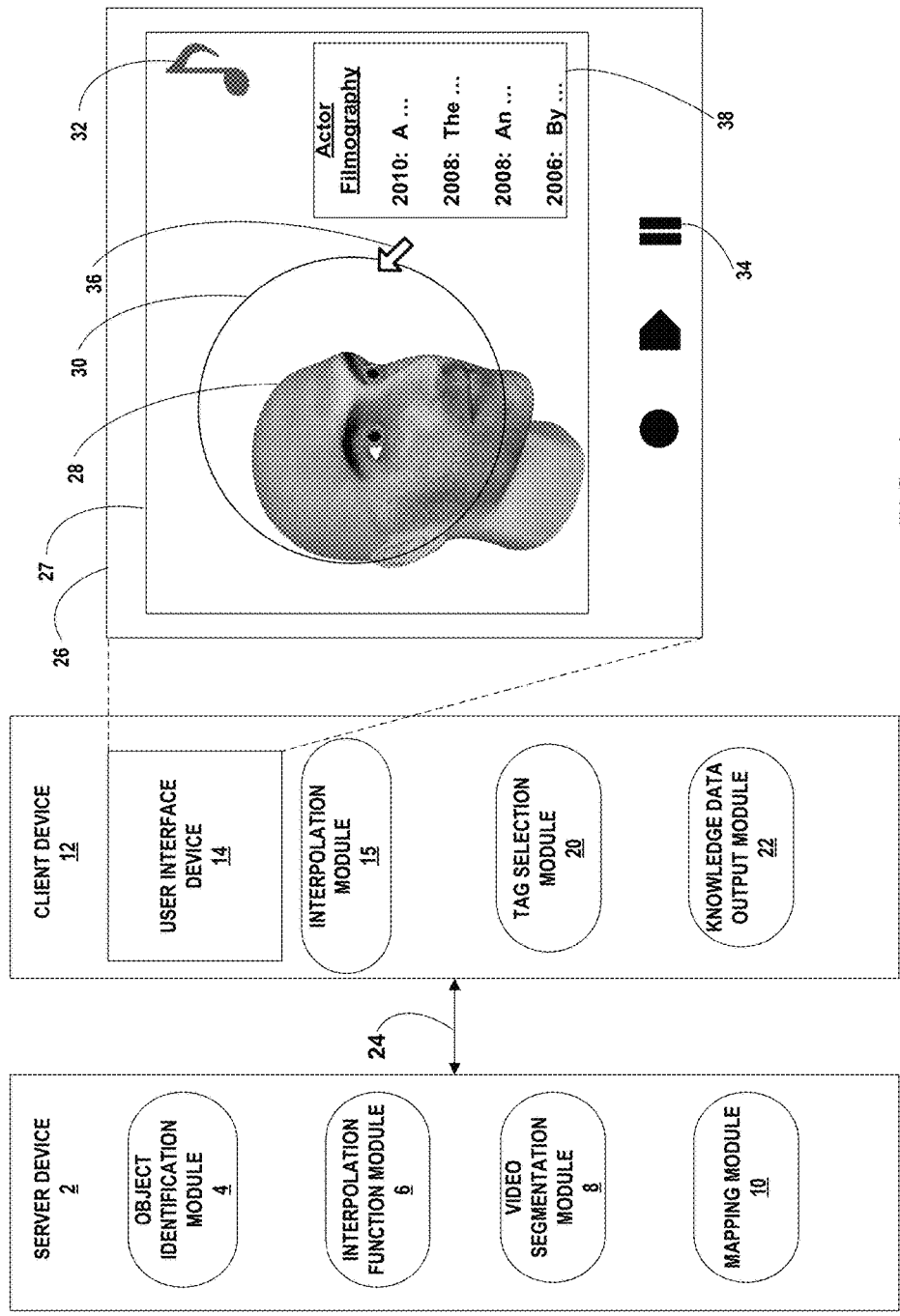
FIG. 1 is a conceptual diagram illustrating details of a server device, a client device, and user interface provided by the client device for video display, in accordance with one or more aspects of this disclosure.

A computing device, or programs executing on the computing device, may play or otherwise output video data. More specifically, the computing device may play a video by displaying a sequence of images (or "video frames"). Additionally, the computing device may output audio data in conjunction with playing the video. In various scenarios, a user may wish to view data associated with objects represented in the played video. For instance, a user may wish to view data, such as a filmography, associated with an actor who is on screen in the played video. As another example, a user may wish to view data associated with an inanimate entity represented in the video, such as a name or location of a particular building, or a name of a song.

In general, techniques of this disclosure are directed to tagging objects represented in frames of a video. The tags may enable a user to access information (e.g., "metadata") associated with various objects represented in frames of the video. For example, techniques are described for computing a position in a given video frame at which to display a tag associated with an object. Additionally, techniques are described for computing a shape and/or size of the tag to be displayed.

In one example aspect, a computing device, such as a server implementing the techniques may detect and identify one or more objects, such as human faces, within the video. Additionally, the server may determine one or more sequences of consecutive video frames that include the object, referred to as a segment. For each segment, the server may determine a position of the object within a starting frame and within an ending frame of the respective sequence. Based on the starting and ending positions of the object across the sequence of video frames ("endpoints"), the server may determine an interpolation function that expresses a movement of the object across the sequence of video frames. The precise interpolation function that expresses the movement of the object across frames may be non-linear, such as an interpolation function that is associated with quadratic motion of the object. The server may approximate the non-linear interpolation function with a linear interpolation function that yields results within an allowed error tolerance. For example, the linear interpolation function may simply specify the position of the object in the starting frame and the ending frame of the video segment, and the time domain in which the interpolation function is valid.

The server may additionally associate a tag with each sequence based on the approximated function, such that the location of the tag within the video frame approximately tracks the movement of the object across the sequence. More specifically, the server may store a representation of the object, as well as information pertaining to the object. In an example where the object is a facial image associated with an actor, the server may store information pertaining to the actor, such as the actor's filmography to date. As another example, if the object is a representation of a location, such as a city skyline, the server may store information pertaining to the city, such as tourism-related data and links to travel websites. Additionally, the server may store a tag function that maps the tag for a particular object to the object-pertinent information. In addition, the server may transmit the video, along with data to indicate various segments based on the presence of one or more objects, including an interpolation function, to one or more client devices, such as a client device used for accessing the video.

In turn, a client device that receives the video from the server may implement one or more techniques of this disclosure to provide a user with lightweight tag-based access to information pertaining to objects in the video. For instance, after or concurrently with downloading or otherwise receiving some or all of a video file from the server, the client device may prepare one or more portions of the file such for a user to view, with the option of accessing the object-pertinent information. More specifically, the client device may identify all "active" tags at a specific instance of the video. As used herein, the term "active" may describe a tag that is associated with an object that is displayed in a current video frame. A given video frame may include a number of active tags, based on the number of objects identified in the frame. For example, the client device may identify, for each sequence of the video file, tags that the server associated with objects represented in the sequence. Additionally, the client device may select or compute a tag shape based on the nature of the object. As a few examples, the client device may select a circular or oblong tag shape for a face, a customized polygon for a building or cluster of buildings, or a musical note shape for an audio object such as a song.

Using the interpolation function provided by the server for a particular object, the client device may determine an approximate motion (e.g., a path) of the object across the sequence. More specifically, the client device may apply the interpolation function to approximate a position of the object within each video frame of the sequence. Based on the approximate position of an object within a frame, the client device may output the appropriate tag concurrently with the corresponding video frame, thereby enabling a user to access an object's tag based on the object's location within a currently displayed video frame.

For example, the client device may output the video, and responsive to receiving a pause request may display a video frame overlaid with tags associated with objects within the video frame, where the shape and position of the tags are computed based on the respective interpolation functions. Additionally, the client device may configure the tag to function as a link to information specific to the respective object. For instance, the client device may enable a user to interact with the tag (e.g., through touch input), thereby invoking a link to the object-pertinent information.

The techniques of this disclosure may provide one more potential advantages. For example, by outputting the tag in the manner described, the client device may conserve resources that the device would otherwise expend by identifying the object in each frame of the video, and outputting the tag accordingly. For example, the client device may conserve a greater amount of resources by downloading and storing only the object information and tag interpolation functions based on the segment endpoints, rather than downloading and storing tag position data for each and every frame of the video. Examples of resources that a client device may conserve by implementing techniques of this disclosure include processing resources, data storage capacity, and computing time. The techniques of this disclosure may be particularly useful in scenarios where a video includes several objects for which the computing device provides metadata, for example.

FIG. 1 is a conceptual diagram illustrating details of server device 2, client device 12, and user interface (UI) 26 provided by client device 12 for video display, in accordance with one or more aspects of this disclosure. Server device 2 may be communicatively coupled with client device 12, as well as with other computing devices, such as various other client devices. As some examples, server device 2 may communicate with client device 12 using one or more types of communicative connections, such as via systems including the Internet, local area networks (LANs), wide area networks (WANs), metropolitan area networks (MANs), wireless protocols such as third generation (3G) and fourth generation (4G) cellular networks, and various others.

In accordance with one or more aspects of this disclosure, server device 2 and client device 12 may not be required to maintain a continuous communicative connection to perform and avail of the interpolated video tagging techniques described herein. Instead, for example, server device 2 may perform one or more server-side techniques of this disclosure, and transmit data 24 to client device 12 over the communicative connection. Upon receiving data 24, client device 12 may perform one or more client-side techniques of this disclosure to perform interpolated video tagging, without requiring further interaction with server device 2. In this manner, client device 12 may display a tagged video and video-pertinent metadata, even in situations where client device 12 is not actively coupled to server device 2, such as when client device 12 does not have access to an Internet connection.

Server device 2 may implement one or more server-side portions of the interpolated video tagging techniques described herein. Although illustrated as a single device for purposes of illustration only, server device 2 may, in various implementations, include a combination of devices, such as various host devices and/or other interconnected computing devices. As shown in FIG. 1, server device 2 may include various components, including object identification module 4, interpolation function module 6, video segmentation module 8, and mapping module 10. In various implementations, the functionalities described herein with respect to two or more modules may be combined into a single module. Conversely, the functionalities described with respect to any one module may be divided among two or more modules.

Server device 2 may store or otherwise access various digital data, such as video files (or simply "video") and various knowledge data. As one example, server device 2 may access knowledge data pertaining to various objects in a video, such as information relating to an actor that appears in the video, inanimate objects such as buildings and geographic locations appearing in the video, and audio data to be output as part of the video, such as a song, a narration, or an identity of an actor performing a voiceover. A video that is accessed by server device 2 may comprise video frames, which may include images and/or pictures. The video may be configured according to particular order in which the video frames are arranged for presentation, such as an order in which the video frames are to be output for display.

Object identification module 4 may be configured or otherwise operable to identify a set of consecutive video frames included in the video that each include a representation of an object. For instance, object identification module 4 may identify a set of consecutive frames, such as a subset of the frames of the entire video, that each includes a representation of the same object. The object may be an actor or inanimate object that is visually represented in these frames, or may be associated with audio data associated with these frames. As used herein, the term "sequence" may define the output of object identification module 4. A sequence may be associated with the identified object, and may include the relevant data in the set of frames identified to represent a continuous appearance of the object in the video or the audio data of the video, such as the time data of these frames (e.g., millisecond and/or frame count), and the shape, size, position, or simply existence, of the identified object in these frames.

Based on one or more parameters, object identification module 4 may identify a sequence as a block of video frames each representing an object, even if certain frames of the sequence do not include the representation of the object. For instance, in one example, object identification module 4 may identify a sequence as representing an actor on screen, even if the sequence includes one or more frames that do not represent the actor, provided that a non-appearance of the representation of the actor does not occur in greater than a threshold number (e.g., two) of consecutive frames of the sequence. In another example, object identification module 4 may identify a sequence that are associated with a voiceover, even if the voiceover is not audible during display of certain frames of the sequence, provided that the inaudibility of the voiceover does not exceed a threshold duration (e.g., two seconds) of the sequence.

In some implementations, object identification module 4 may determine the existence of an object for a finite number of frames, such as one frame, two frames, etc. after an endpoint frame, to enable a client device to output a tag for the object for some time after the object ceases to exist in the video. In this manner, object identification module 4 may enable a user to access a tag and/or associated knowledge data for some time after the object ceases to exist in the video. For example, object identification module 4 may determine that a song exists during extra frames spanning a few seconds after the song actually ends, to account for such situations as when the end of the song is recognized in error due to fading out or muffling by other sounds concurrent with the song, or when the song is cut short in the video's audio track whereas the user still expects the song to continue playback and hence its tag visible. By allowing for brief absences of the object from a sequence, object identification module 4 may account for circumstances, such as a flash of light in the video or a foreground object, that occlude a visual object in a frame, or for pauses that occur during a voiceover or song playback. Such absences of an object may also be referred to herein as "gaps" or "holes." In this manner, object identification module 4 may implement the techniques of this disclosure to account for absences of an object that result from common conditions in video and associated audio.

In examples, object identification module 4 may fragment or "cut" a continuous representation of an object along the video time into multiple sequences covering different sections of the duration of that continuous appearance. For instance, object identification module 4 may determine that, at a certain frame, the object representation "jumps" so substantially and/or rapidly in relation to the representation in the previous frame(s), that such movement would not be logically identified as continuous, and so defines a sequence to end before that frame and a new sequence to start at that frame. As used herein, the term "movement" may be associated with any one or more of a size change, a position change, a shape change, and existence change of an object. For example, a substantial movement may be associated with a dimension parameter (width, height, x-coordinate position, y-coordinate position, diameter, radius, etc.) changing for more than a threshold number (e.g. 30% (0.3) of the video frame's width or height. For instance, a jump may be associated with an error value that exceeds a threshold error value that is associated with discontinuous movement of the object.

In examples, object identification module 4 may detect one or more objects in the video and/or audio data of the video, and track the continuous, or substantially continuous, representation of the object(s) along the video time. Object identification module 4 may output one sequence per object for each substantially continuous representation, and some such sequences may overlap with each other in terms of time. For example, object identification module 4 may identify a sequence that covers frames 500-600 as associated with appearances of an actor, and another sequence that covers frames 550-650 as associated with playing of a song. In this example, the sequences associated with the actor and the song overlap at frames 550-600 of the video.

In some implementations, a sequentializer module (not shown in FIG. 1) that is included in, or coupled to object identification module 4 may form multiple sequences from one continuous appearance of an object, if in at least one frame in the continuous appearance, the object is associated with multiple representations. For example, object identification module 4 may identify representations of an actor that appear continuously through frames 500-650. Additionally, in this example, each frame of the range 550-600, the actor may have two representations (e.g. the actor and a portrait of the actor are both represented on screen), whereas every other frame of the range 500-650 may include only one representation of the actor. Based on various criteria, the sequentializer module may determine that the representations positioned closer to the left edge of the screen in frames 550-600 and the single representations before frame 550 belong to the same sequence due to continuity. Additionally, the sequentializer module may determine that the representations positioned closer to the right edge of the screen in frames 550-600 and the single representations after frame 600 belong to another sequence. In other words, object identification module 4 may determine "virtual objects," or different instances of the otherwise identical object, to associate with different sequences that overlap in terms of time.

In some examples, video segmentation module 8 of server device 2 may be configured or otherwise operable to determine a first time and last time of the sequence of video frames identified by object identification module 4 at which an object exists, while in other examples the operations described as being performed by video segmentation module 8 may be performed implicitly by interpolation function module 6. In various implementations, video segmentation module 8 may determine the first and last times of the sequence at which the object exists, based on a frame count, a timestamp, or other criteria. For instance, video segmentation module 8 may determine that the 500$^{th}$ and 600$^{th}$ frames of the video correspond to the first and last times that an actor appears on screen during a particular sequence of frames of the video. As another example, video segmentation module 8 may determine that a portion of a song plays from a timestamp corresponding to 20:51 (minute:second) of the video to a timestamp corresponding to 25:32 of the video. The sequence of frames associated with an object may be referred to herein as a "segment" of the video, and the first and last times that an object exists in the sequence, as identified by video segmentation module 8 may be referred to herein as the "endpoints" of the segment. In various instances, video segmentation module 8 may determine a segment based on heuristic data, such as segmentation data previously determined with respect to other videos.

In examples, video segmentation module 8 may partition each sequence into segments, in a manner that is computationally feasible, such that movement of the virtual object in each such segment may be described in simple mathematical functions. Video segmentation module 8 may output a number of segments per sequence. Video segmentation module 8 may provide certain details pertaining to where to cut a segment, such as based on heuristics in scenarios where server device 2 is enabled to process the requisite complexity. Alternatively, video segmentation module 8 may simply determine where to cut a segment based on the definition of the interpolation function's valid time domain as provided by interpolation function module 6.

As used herein, the term "segment" may be associated with a partition of a sequence in which an object's movement and/or size change may be represented using simple mathematical functions. The term "sequence" may be associated with a continuous or substantially continuous appearance of a virtual object in the video. The term "endpoint" may be associated with the beginning of a sequence, e.g. the beginning of the first segment in the sequence, the end of a sequence, e.g. the end of the last segment in the sequence, or the point in the middle of the sequence where segmentation occurs. In turn, a sequence may comprise one or more segments. Sequences associated with different virtual objects may overlap in terms of time (e.g., by sharing one or more common frames), but different segments associated with a single virtual object do not overlap in terms of time.

As described, object identification module 4 may identify multiple different objects in the video. In turn, in some examples video segmentation module 8 may identify one or more segments for each identified object. In examples, a single object may be associated with multiple segments, such as disjointed appearances by an actor in the video, where the appearances are separated by lapses of time and/or frames. Additionally, video segmentation module 8 may identify overlapping segments associated with different objects, and/or may identify overlapping segments associated with different instances of an object, or "virtual objects" that represent, for example, multiple representations (e.g. an actor and the actor's portrait) associated with the same object. For example, video segmentation module 8 may identify a segment that has endpoints of frames 500-600 associated with appearances of an actor, and another segment that has endpoints of frames 550-650 associated with playing of a song. In this case, the segments associated with the actor and the song overlap at frames 550-600 of the video. In this manner, object identification module 4 and video segmentation module 8 may identify multiple objects and multiple segments corresponding to the objects in a video.

Interpolation function module 6 of server device 2 may determine an interpolation function associated with the existence of an object in each corresponding segment. More specifically, the interpolation function as defined by interpolation function module 6 may specify a time domain of the video in which the interpolation function is valid. In various examples, the interpolation function may be a linear function that is based on the position of the object at each endpoint of the segment. For instance, in a scenario where the object is an actor who appears on screen, interpolation function module 6 may determine the positions of the representation of the actor in each endpoint frame of the segment. Based on the positions of the representation of the actor in each endpoint frame of the segment, interpolation function module 6 may determine the interpolation function as a linear function representing the movement of the object across the segment between the two endpoint positions.

In instances of visually represented objects, such as an actor who is on screen, interpolation function module 6 may determine the interpolation function as a linear function to represent a movement of the object across the segment. For instance, if the object is visually represented at a bottom left corner of the first endpoint frame, and is represented at a top right corner of the last endpoint frame, interpolation function module 6 may approximate a linear interpolation function that assumes the object moves, at a constant rate, from the bottom left corner to the top right corner of a display, across the segment. Even if the actual movement of the object across the segment does not conform to any linear function, and the determined movement resulting from the approximated linear interpolation function deviates from the actual movement of the object across the segment, interpolation function module 6 may determine the interpolation function as a linear function that approximates the movement of the object, allowing for a tolerable margin of error from the actual movement of the object. Interpolation function module 6 may express the linear function in terms of simply listing the position of the object (e.g., the position of a center of an object) at each of the first and last time the object appears in the segment.

In some implementations, interpolation function module 6 may set a threshold for tolerable error at a value of 0.8% (or 0.008), or at 2% (or 0.02) from the actual movement of the object, relative to the dimension of the video. In some implementations, interpolation function module 6 may assign different error thresholds (e.g., in a progressive or graduated manner), based on various criteria, such as object size. For example, an object having a smaller size in a given frame may be assigned a smaller error threshold for that frame (and/or for other frames), and an object having a larger size in a given frame may be assigned a larger error threshold for that frame.

In various examples, interpolation function module 6 may determine the interpolation function with respect to linear movement of the object of the object across the segment, quadratic movement of the object or change in shape of the object across the segment, or both. More specifically, linear movement may be associated with movement of the object with respect to a length and/or width of the respective frames of the segment. In some examples, such as in cases of only linear movement of an object, interpolation function module 6 may determine the interpolation function to include only the endpoint data for the object. On the other hand, quadratic movement may be associated with movement of the object with respect to a depth perspective of the frames of the segment. For instance, quadratic movement may represent a change in perceived distance between the object and an image capture device that captured the frame. Quadratic movement may result from an object moving closer to or farther from the image capture device, or through movement and/or zooming of the image capture device, and may be expressed as a linear change in size of the tag representing the object.

In some examples, interpolation function module 6 may use other types of simple mathematical functions, such as quadratic functions, exponential functions, trigonometric functions, etc., to describe the movement of the object across the segment. Interpolation function module 6 may generate one or more simple mathematical functions for each segment to be received by client device 12. Additionally, interpolation function module 6 may output one or more interpolation functions per segment, such as to describe various aspects (size changes, position changes, etc.) of the movement. In various implementations, interpolation function module 6 may share one or more functionalities with video segmentation module 8, in order to more readily supply data or feedback that video segmentation module 8 may utilize in determining segmentation schemes.

Mapping module 10 of server device 2 may be configured or otherwise operable to identify various knowledge data associated with an object identified by object identification module 4. For instance, mapping module 10 may identify knowledge data including filmography information for an actor identified by object identification module 4 as existing in a frame of the video. In various implementations, mapping module 10 may identify knowledge data that is stored locally on server device 2, or knowledge data that server device 2 accesses via a communicative connection, such as through an Internet connection.

Additionally, mapping module 10 may map particular portions of the identified knowledge data to particular objects identified in the video by object identification module 4. As one example, object identification module 4 may identify an actor as well as a geographic location, such as a city, as being on screen in various frames of the video. In this example, mapping module 10 may identify knowledge data associated with both the actor and the city. Additionally, mapping module 10 may map particular portions of the knowledge data to each object, such as the actor's filmography information to the actor, and historical and/or tourism information to the city. In this manner, mapping module 10 may arrange particular knowledge data according to pertinent objects identified by object identification module 4 in a video.

In examples, mapping module 10 may map a sequence for each virtual object sequence to a real object and pertinent knowledge data, using various technologies available to mapping module 10, or based on manual input. For instance, mapping module 10 may, at this stage, map different virtual objects in the same time domain to the same real object. Additionally, mapping module 10 may be enabled to function independently from one or both of video segmentation module 8 and interpolation function module 6, as mapping module 10 may not require data supplied by these modules in determining the mapping data.

Server device 2 may transmit one or more of the video, indications of objects identified by object identification module 4 in the video, and an indication of the interpolation function as part of data 24 to client device 12. While described herein with respect to information that server device 2 may transmit to client device 12, it will be appreciated that data 24 may include various information exchanged between server 2 and client device 12 over a communicative connection. Server device 2 may transmit, and client device 12 may receive, the video, and an indication of the interpolation function as part of data 24 to client device 12 via respective interfaces, such as network interfaces, of server device 2 and client device 12.

Client device 12 may receive the video, indications of one or more objects represented in the video, indications of one or more interpolation functions, and knowledge data associated with each indicated object, as part of data 24 from server device 2. In various instances, the video may include a plurality of video frames, and the interpolation function may specify a time domain of the video in which the interpolation function is valid. As described, the time domain may be expressed in terms of frame counts and/or timestamps, among other options.

Interpolation module 15 may be configured or otherwise operable to determine a position, for a given time in the video (e.g., for a given frame) for a tag associated with each indicated object. More specifically, interpolation module 15 may determine the positions for the tag based on the application of an interpolation function received from server device 2. For example, interpolation module 15 checks downloaded data from server device 2 to determine which interpolation functions are defined for a given time. Interpolation module 15 then inputs a selected time (e.g., a frame number at which the video is paused) into each interpolation function that is defined for that time to obtain the result for where to display the corresponding tag for each object for which a tag can be displayed in that frame.

In some examples, interpolation module 15 also uses the interpolation function to compute a shape and/or size of the tag to display. For example, where the tag is defined as a circular shape, the radius or diameter of the tag may be defined by the interpolation function as a function of time, e.g., frame number. Alternatively or additionally, in some examples, interpolation module 15 may determine a shape of the tag, based, for example, on the nature of the identified object in the segment. For instance, in the example of a human face, interpolation module 15 may determine the shape of the tag to be a circle or an ellipse, while in the case of a geographic location, such as a city identified by the city's skyline, interpolation module 15 may determine the shape of the tag to be a polygon generated using Bézier curves or other modeling techniques.

Interpolation module 15 may cause client device 12 to output one or more frames of the video for display, such as at user interface (UI) device 14, and, for example, by using a video player application running on client device 12. While shown as part of client device 12 for the purpose of example, UI device 14 may, in various implementations be separate from client device 12, and optionally coupled to client device 12 to enable communication. As shown in FIG. 1, UI device 14 outputs user interface (UI) 26 for display. UI 26 includes several UI elements, including video frame 27, facial object 28, and tag 30. For example, facial object 28 may be associated with an actor, athlete, or other person who is represented on screen during a segment of the video. Additionally, interpolation module 15 may determine the position, size, and shape of tag 30 based on an interpolation function defined for facial object 28 and downloaded from server device 2. Additionally, each tag for which interpolation module 15 determines positions in the segment may be associated with knowledge data corresponding to a particular object identified for the segment.

As shown in FIG. 1, in some examples interpolation module 15 may position tag 30 such that tag 30 is askew from facial object 28, i.e., not precisely aligned with facial object 28, based on the interpolation function. In the specific example of FIG. 1, portions of facial object 28 are positioned outside the bounds of tag 30, such as portions of the right ear and chin of facial object 28. Additionally, tag 30 covers a substantial portion of video frame 27 that does not represent facial object 28. As described, the interpolation function received by client device 12 may approximate a movement of facial object 28 across a segment of video frames, within a threshold margin of error. In turn, the position of tag 30 output by the interpolation function may deviate, within the margin of error, from the actual position of facial object 28 in a given frame of the sequence of video frames.

Similarly, interpolation module 15 may determine one or more dimensions of tag 30 using the interpolation function. For instance, interpolation module 15 may use the interpolation function to determine the diameter or radius of tag 30 in video frame 27. Additionally, in the example of FIG. 1, interpolation module 15 may select a circular shape for tag 30, based on the determination that facial object 28 represents a human face, e.g., by looking up the object type in a database that maps object types to tag shapes.

UI 26 also includes audio tag 32. Audio tag 32 may be associated with a song that client device 12 outputs in conjunction with outputting video frame 27 for display. Client device 12 may download an interpolation function associated with the song object defined for the song, where the interpolation function is defined as a static or non-interpolated function with respect to the segment of the video during which the song plays. For example, the interpolation function for the song object may simply indicate whether the song object exists or not for any given time in the video. For instance, interpolation module 15 may apply the received interpolation function to determine that the song object is not associated with a particular position within any frame of the segment. Interpolation module 15 may, in some examples, determine an identical position for audio tag 32 with respect to every frame of the segment associated with the song object. In some examples, interpolation module 15 may place audio tag 32 within video frame 27 such that audio tag 32 does not overlap with any other tag in frames of the current segment that include other tags, such as tag 30, a position that may vary from frame to frame depending on the placement of other tags. In the specific example of FIG. 1, audio tag 32 is expressed as an icon resembling a musical note. In this manner, interpolation module 15 may implement client-side techniques of this disclosure to output multiple tags in such a manner that the tags are visually separate, improving the experience for a user of client device 12.

In some examples, interpolation module 15 may cause UI device 14 to display one or both of tag 30 and audio tag 32 in response to certain conditions, such as receiving a user input. For instance, in an implementation where UI device 14 includes a presence-sensitive device, such as a touchscreen, interpolation module 15 may detect a user input, such as a touch input provided with a finger or stylus, at an area of UI device 14 corresponding to pause button 34. In response to detecting the touch input at pause button 34, interpolation module 15 may cause client device 12 to pause the display of the video, such as by causing a video player application running on client device 12 to stop display at video frame 27. In addition, interpolation module 34 may run the interpolation functions defined at video frame 27 to determine where to output one or both of tag 30 and audio tag 32 for display. In another implementation, interpolation module 15 may output tag 30 in response to the touch input at pause button 34, while outputting audio tag 32 during display of the video.

Tag selection module 20 of client device 12 may be configured or otherwise operable to detect a selection of one or both of tag 30 and audio tag 32. For instance, in implementations where UI device 14 includes a touchscreen, tag selection module 20 may detect the selection based on a touch input provided at or substantially at tag 30 and/or audio tag 32 using a finger or stylus. In response to detecting the selection of tag 30 and/or audio tag 32, tag selection module 20 may communicate an indication of the user selection to knowledge data output module 22.

In turn, knowledge data output module 22 may output, for display, a portion of the received knowledge data that is mapped to the particular object associated with the selected tag. For instance, in response to receiving an indication from tag selection module 20 of a detected selection of tag 30, knowledge data output module 22 may cause UI device 14 to display knowledge data box 38. In the example of FIG. 1, knowledge data box 38 may include a partial or full filmography associated with the actor represented by facial object 28, and/or links to additional knowledge data associated with the actor. Similarly, if tag selection module 20 relays an indication of a selection of audio tag 32, knowledge data output module 22 may output a song title, album and/or artist information, and/or other knowledge data pertinent to the song associated with audio tag 32.

Using the interpolation functions, object data, and knowledge data downloaded from server 2, client device 12 may provide the tagged video even in situations where client device 12 is not currently connected to server device 2. Additionally, by using the interpolation functions to determine how to display the tags for the video, techniques of this disclosure may enable client device 12 to conserve resources that client device 12 would otherwise expend by downloading and storing data identifying facial object 28 and/or the song object of audio tag 32 in each frame of the video, and outputting the corresponding tags accordingly. In scenarios where a video includes several objects, such as facial object 28, the song object, and potentially other objects, for which client device 12 provides knowledge data, client device 12 may conserve a greater amount of resources by storing and downloading only the object information and tag functions based on the segment endpoints, rather than tag position data for each and every frame of the video. Examples of resources that client device 12 may conserve by implementing techniques of this disclosure include processing resources, data storage capacity, and computing time.

Figure 2:
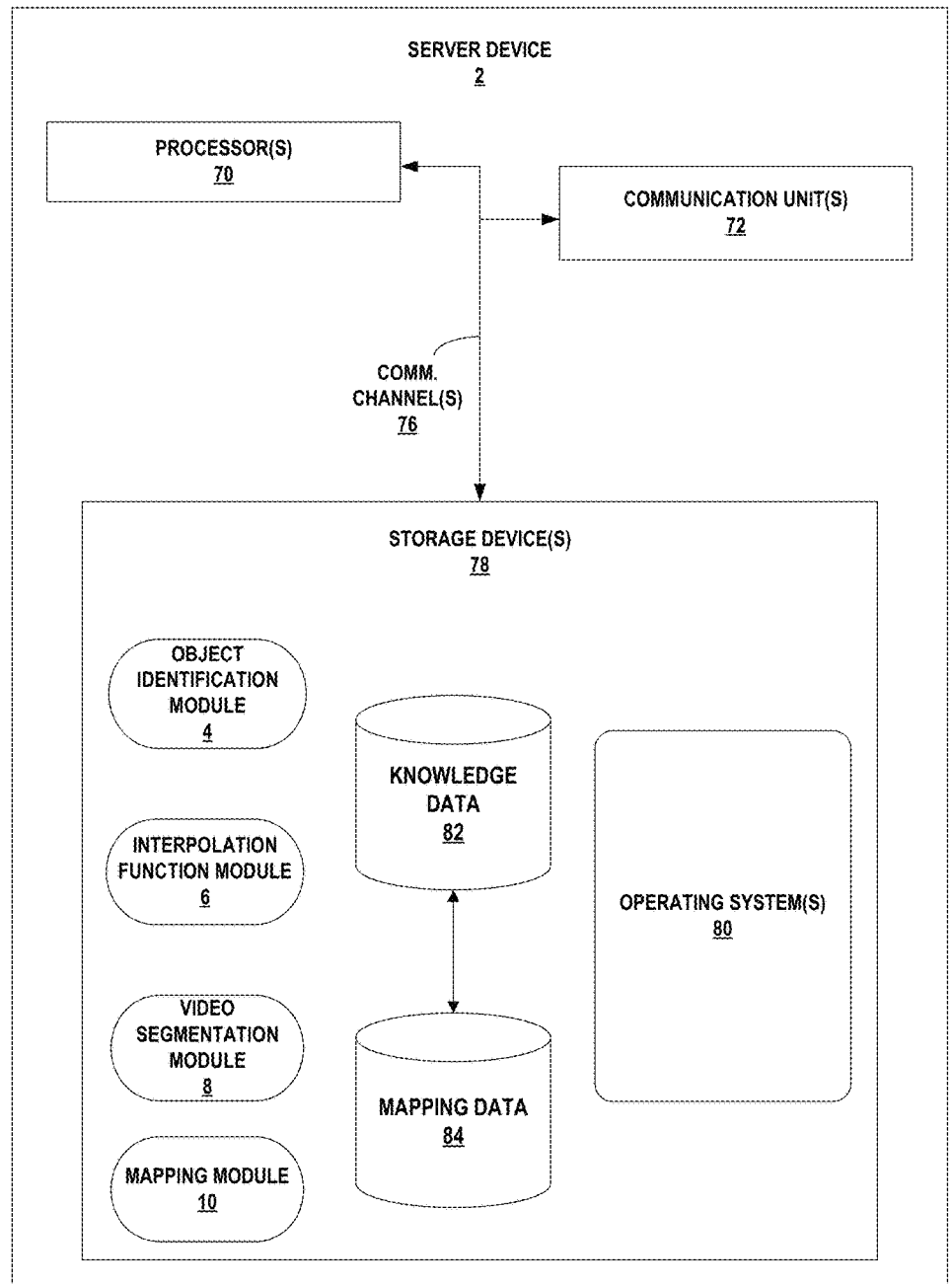
FIG. 2 is a block diagram illustrating details of a server device configured to perform one or more server-side interpolated video tagging techniques of this disclosure.

FIG. 2 is a block diagram illustrating details of an example implementation of server device 2 configured to perform one or more of server-side interpolated video tagging techniques of this disclosure. In the particular implementation illustrated in FIG. 2, server device 2 may include one or more processors 70, one or more communication units 72, and one or more storage devices 78.

One or more processors 70 are, in various examples, configured to implement functionality and/or process instructions for execution within server device 2. For example, processors 70 may process instructions stored on or otherwise accessible through storage device(s) 78. Such instructions may include components of one or more operating systems 80, object identification module 4, interpolation function module 6, video segmentation module 8, and mapping module 10.

In the implementation illustrated in FIG. 2, server device 2 also includes one or more communication units 72. Server device 2, in one example, utilizes communication unit(s) 72 to communicate with external devices via one or more networks, such as one or more wireless networks. Communication unit (s) 72 may include one or more of a network interface card, such as an Ethernet card, an optical transceiver, a radio frequency transceiver, or any other type of device that can send and receive information. Other examples of such communication units may include network interfaces such as Bluetooth®, 3G, 4G, and WiFi® radios in mobile host devices as well as universal serial bus (USB). In some examples, server device 2 utilizes communication unit(s) 72 to wirelessly communicate with external devices, such as one or more client devices, over a network.

One or more storage devices 78 may be configured to store information within server device 2 during operation. Storage device(s) 78, in some examples, are described as a computer-readable storage medium and/or as one or more computer-readable storage devices. In some examples, storage devices 78 comprise temporary memory, meaning that a primary purpose of storage device(s) 78 is not long-term storage. Storage device(s) 78, in some examples, are described as a volatile memory, meaning that storage device(s) 78 do not maintain stored contents when the computer is turned off. Examples of volatile memories include random access memories (RAM), dynamic random access memories (DRAM), static random access memories (SRAM), and other forms of volatile memories known in the art. In some examples, storage device(s) 78 are used to store program instructions for execution by processor(s) 40. Storage device(s) 78, in one example, are used by software or applications running on server device 2 to temporarily store information during program execution.

Each of components 70, 72, and 78 may be interconnected (physically, communicatively, and/or operatively) for inter-component communications. In some examples, one or more communication channels 76 may include a system bus, network connection, inter-process communication data structure, or any other channel for communicating data. As one example in FIG. 2, components 70, 72, and 78 may be coupled by one or more communication channels 76.

One or more operating systems 80 may control one or more functionalities of server device 2 and/or components thereof. For example, operating system(s) 80 may interact with one or more of object identification module 4, interpolation function module 6, video segmentation module 8, and mapping module 10, and may facilitate one or more interactions between these modules and one or more of processor(s) 70 and communication unit(s) 72 via communication channel(s) 76. In some examples, one or more of object identification module 4, interpolation function module 6, video segmentation module 8, and mapping module 10 may be included in operating system(s) 80. In other examples, one or more of object identification module 4, interpolation function module 6, video segmentation module 8, and mapping module 10 may be implemented externally to server device 2, such as at a network location. In some such instances, server device 2 may use communication unit(s) 72 to access and implement functionalities provided by various modules illustrated with respect to server device 2 and their respective components, through methods commonly known as "cloud computing."

As described, object identification module 4 may be operable to identify particular objects represented in a video, including, for example, a person, such as an actor or an athlete, audio data such as a song or voiceover, particular structural facilities such as buildings, and geographic locations such as cities or countries. To identify such objects in video, object identification module 4 may implement various identification technologies such as facial recognition, voice recognition, acoustic fingerprinting, and pattern recognition. In addition, object identification module 4 may identify objects in video by comparing image or audio data in the video against confirmed image or audio data, such as portions of data stored to storage device(s) 78 and/or to remote devices to which server device 2 is communicatively coupled. In some implementations, object identification module 4 may also identify one or more objects based on user input.

Interpolation function module 6 may be operable to determine an interpolation function for an object identified by object identification module 4, and video segmentation module 8 may determine a corresponding video segment for the object based on the interpolation function. As described, the interpolation function may express attributes for a tag associated with the object. Examples of such attributes of the tag may include a position expressed in Cartesian coordinates, as well as size data and shape data for the tag.

In one illustrative example, interpolation function module 6 may receive, from object identification module 4, an indication of a facial object, such as an identified actor, being present in a segment of the video. Based on the respective positions and sizes of the facial object in each endpoint frame of the segment, interpolation function module 6 may generate an interpolation function that expresses linear movement of the object and/or a shape of the object as a function of time across the segment.

Using example values for the Cartesian coordinates and dimensional data for a circular object, in one example interpolation function module 6 of server device 2 determines the interpolation function as a linear function between the following endpoint positions:

$$\text{At } f = 500, \text{Circle}\left(x = \frac{5}{6}, y = \frac{1}{3}, d = \frac{1}{6}\right) \quad (1)$$

$$\text{At } f = 600, \text{Circle}\left(x = \frac{1}{6}, y = \frac{5}{9}, d = \frac{1}{4}\right) \quad (2)$$

In the example endpoints (1) and (2) above, the constants represent values expressed in terms of a fraction of a particular dimension of a quadrilateral frame. More specifically, the x-attribute may denote the horizontal position of the circle's center as a fraction of the video frame's width, offset from the left edge of the video frame, and the y-attribute may denote the vertical position of the circle's center as a fraction of the video frame's height, offset from the top edge of the video frame. Additionally, the d attribute may denote the circle's diameter as a fraction of the length of the video frame's diagonal. The example endpoints may express the circle's general movement, as the video progresses from frame 500 to frame 600, as leftwards (from 5/6 to 1/6) downwards (from 1/3 to 5/9), and growing larger (from 1/6 to 1/4). Interpolation function module 6 of server 2 may derive a linear function based on endpoints (1) and (2) to describe the circle's approximate movement such that all attributes (x, y and d) change at constant rates across the time range from frame 500 to frame 600.

In instances where the object is not visually represented in the frames of the segment, as in the case of a narration, interpolation function module 6 may determine that the object is static across a segment, thereby generating a static interpolation function.

$$S(f) = \begin{cases} 1 & \text{if } 500 \le f \le 600 \\ 0 & \text{if } f < 500 \text{ or } f > 600 \end{cases} \quad (3)$$

Equation (3) is an example of a static interpolation function. More specifically, equation (3) provides a binary indication of whether an object exists in particular frames within or exterior to a segment. In the example of equation (3), the function S indicates that the object exists at frame numbers 500 through 600, and does not exist at frames preceding frame number 500 or subsequent to frame number 600.

In some instances, interpolation function module 6 may generate an interpolation function that accounts for perceived differences in size of the object. For example, interpolation function module 6 may determine a difference in the diameter of a circular or substantially circular object, such as a human face. An increase in the diameter may be associated with a decrease in the perceived distance between the object and the image capture device, as may be caused by the object moving closer to a camera, or by zooming in of the camera towards the object. In other examples, interpolation function module 6 may determine differences in perceived size based on other dimensions, such as a side of a square, circumference of any polygon, one or both axes of an ellipse, and others. In turn, the determined shape and/or size of the object may be associated with the shape and/or size of a tag associated with the object. In this manner, interpolation function module 6 may determine the interpolation function for an object that accounts for linear movement of the object as well as for changes in shape and/or size of the object, as well as for the static nature of certain object types.

An example set of raw data associated with the interpolation function determined by interpolation function module 6 for an object at a frame count denoted by 'f' may be as follows:

$f = 100$, Circle($x = 0.3$, $y = 0.2$, $d = 0.1$);

$f = 101$, Circle($x = 0.31$, $y = 0.21$, $d = 0.1$);

$f = 102$, Circle($x = 0.321$, $y = 0.22$, $d = 0.1$);

$f = 103$, Circle($x = 0.329$, $y = 0.23$, $d = 0.1$);

$f = 104$, Circle($x = 0.34$, $y = 0.24$, $d = 0.1$);

$f = 105$, Circle($x = 0.352$, $y = 0.25$, $d = 0.1$);

$f = 106$, Circle($x = 0.357$, $y = 0.26$, $d = 0.1$);

$f = 107$, Circle($x = 0.371$, $y = 0.27$, $d = 0.1$);

$f = 108$, Circle($x = 0.381$, $y = 0.28$, $d = 0.1$);

$f = 109$, Circle($x = 0.39$, $y = 0.29$, $d = 0.1$);

$f = 110$, Circle($x = 0.40$, $y = 0.30$, $d = 0.1$);

...

$f = 119$, Circle($x = 0.49$, $y = 0.39$, $d = 0.1$);

$f = 120$, Circle($x = 0.6$, $y = 0.4$, $d = 0.1$);

$f = 121$, Square($x = 0.5$, $y = 0.4$, $d = 0.1$);

$f = 122$, Square($x = 0.5$, $y = 0.5$, $d = 0.11$);

...

As used herein, the term "R" may refer to a lookup function which yields corresponding raw data at a given frame within the range of frames 100-122, from the data above. For instance, R(120)=Circle(x=0.6, y=0.4, d=0.1).

In this example, the circle associated with the object from frame 100 to frame 110 changes approximately according to the following formula:

$$x = 0.3 + 0.1p,$$

$$y = 0.2 + 0.1p,$$

$$d = 0.1,$$

$$\text{where } p = \frac{(f - 100)}{10}.$$

In this example, p denotes a proportion/percentage/progress. The value of p may range linearly from 0.0 to 1.0 for f=100 to 110. More specifically, a partition corresponding to frames 100 through 110 in the domain of raw data for frames 100 through 122 may conform approximately to the following function:

$$S(f: 100 \ldots 110) = \text{Circle}(x = 0.3 + 0.1p, y = 0.2 + 0.1p, d = 0.1)$$

$$\text{where } p = \frac{(f - 100)}{10}.$$

When compared to the raw data described, the interpolation function may include one or more errors. For example, the maximum error of the interpolation function with respect to the above data set may occur at f=106, where the function S yields Circle(x=0.36, y=0.26, d=0.1), but R(106) yields Circle(x=0.357, y=0.26, d=0.1), indicating an error of 0.003 with the x coordinate, which may fall within the threshold for tolerable error for the function S(f) to approximate the value of R within tolerable error within the particular domain of S(f). In other words, S may be defined as a segment in R. However, S may not, in some scenarios, be included in the final segmentation of R determined by video segmentation module 8.

The example above illustrates function S with three linear subfunctions for p, x and y, and a constant subfunction for d. Interpolation function module may utilize any mathematically simple function type, as long as the function may facilitate representation of the segment. Such simple functions may include, but are not limited to, polynomial in low degrees, such as 0 to 2, where degree 0 is constant function (y(x)=c), degree 1 is linear (y(x)=ax+b), degree 2 is quadratic (y(x)=ax$^2$+bx+c), inversely proportional function (y(x)=c/x), etc.

As described with reference to FIG. 1, in some cases video segmentation module 8 may determine particular video segments associated with an object identified by object identification module 4. For instance, video segmentation module 8 may identify a contiguous sequence of video frames, such that each frame of the sequence includes a representation of the object. As another example, video segmentation module 8, either independently or in collaboration with object identification module 4, may identify a contiguous sequence of video frames, such that the object is absent from no more than a threshold number of consecutive video frames of the sequence.

Additionally, video segmentation module 8 may split a sequence produced by object identification module 4 into multiple segments. In some examples, video segmentation module 8 may do so by setting a threshold level of tolerable "jump" of movements of the object among consecutive frames. The jump-based cuts of sequences may be performed independently from, or in addition to, sequence cuts described above with respect to object identification module 4. For instance, video segmentation module 8 may determine that a maximum tolerable jump corresponds to a value of 25%, i.e., a factor of 0.25 distance units (e.g., centimeter or inch). In some implementations, the distance unit may represent a fraction of a frame dimension, such as a fraction of a frame height or width. In the example of quadratic movement of the object, video segmentation module 8 may detect an error exceeding the threshold if a particular measurement, such as a diameter corresponding to an estimated circular representation of an identified object, such as a facial object, deviates by a factor of more than 0.25 distance units between two consecutive video frames.

In one example, the diameter associated with the object may transition from 0.3 of a distance unit in frame number 550, to 0.5 of the distance unit in frame number 551 of the video. In this example, video segmentation module 8 may determine that the deviation is 0.2 distance units, thereby falling within the tolerable error threshold. In contrast, if video segmentation module 8 determines that the diameter of the facial object deviates by a factor of 0.3 distance units from frame number 600 to frame number 601, video segmentation module 8 may determine a segment transition. More specifically, video segmentation module 8 may determine that frame number 600 forms an endpoint (e.g., last frame) of a segment for the facial object, and that frame number 601 forms an endpoint (e.g., initial frame) of a subsequent segment for the facial object. If, for instance, video segmentation module 8 determines that the diameter deviates by a factor of 0.4 distance units from frame number 601 to frame number 602, video segmentation module 8 may determine yet another segment transition, thereby making frame number 601 a single-frame segment with respect to the object. Additionally, video segmentation module 8 may detect movement jumps exceeding the threshold corresponding to multiple subsequent pairs of consecutive frames. In this scenario, video segmentation module 8 may generate a series of single-frame segments for the object. In this manner, video segmentation module 8 may generate single-frame segments, or segments including a relatively low number of frames, in situations of rapid or disjointed movement of a visual object in the video.

Video segmentation module 8 may determine segment endpoints based on whether the data in the segment can be described using one more mathematically simple functions. In various instances, video segmentation module 8 may detect segment endpoints based on criteria such as shape type changes or change of a movement trend. In an example of a shape type change-based determination, different shape types generally could not be described together mathematically simply. For instance, in the raw data examples listed above, the shape type changes from a circle to a square at the transition from f=120 to f=121. Video segmentation module 8 may interpret this change as a signal that a new segment begins at f=121. However, video segmentation module 8 may recognize certain shape type changes as "compatible" by generalizing the more specialized shape to the more generic shape. For example, if a circle shape is turning into a rotated oval or vice versa, video segmentation module 8 may upgrade the circle to be an oval with equal axes and with arbitrary rotation. In this manner, video segmentation module 8 may mitigate the shape type change at the transition point.

In a scenario of change of movement trend, if video segmentation module 8 determines that a particular shape attribute (e.g. the x position of the circle's center) has been increasing, but suddenly changed to decreasing from a specific frame, video segmentation module 8 may determine that the specific frame is a likely data point to start a new segment, otherwise interpolation function module 6 may no longer be able to adjust a previously determined interpolation function to include the data at the new frame without creating a larger error.

In an example of a collaborative technique implemented by interpolation function module 6 and video segmentation module 8, video segmentation module 8 determines the start of a segment, such as at frame $f_0$, where $f_0$ is the time/frame number of the start of the whole sequence or immediately follows the last segment defined previously using this workflow. Additionally, video segmentation module 8 defines a candidate segment to be from $f_0$ to f, where f is initialized to be equal to $f_0$. Next, video segmentation module 8 feeds interpolation function module 6 the raw frame data between $f_0$ and f, and submits a request to interpolation function module 6 to generate an interpolation function approximating all the data in these frames within a particular error tolerance threshold. This example collaborative technique may be an iterative process, e.g. if interpolation function module 6 is able to store the previously provided data from $f_0$ to the frame immediately preceding f, then video segmentation module 8 may only need to provide the data at f. Additionally, interpolation function module 6 may have direct access to the raw frame data, in which case video segmentation module 8 may only need to provide interpolation function module 6 with the range "$f_0$ to f" for which to retrieve frame data.

If interpolation function module 6 is able to generate the requested interpolation function, then video segmentation module 8 may extend the candidate segment by incrementing f to the next frame for which data is available, and requests interpolation function module 6 to adjust the previously generated function or provide a new one to include the data at the new frame. This process continues until interpolation function module 6 could not generate an appropriate function without going over the error tolerance threshold, at which point interpolation function module 6 may provide to video segmentation module 8 a particular frame at which to end the candidate segment, f', which is between $f_0$ and the last frame before f. The last frame before f is often f−1, absent any frame skips as described above.

The process described above may also terminate if, at the point of incrementing f, video segmentation module 8 determines that f was already at the end of the whole sequence so the frame count could not be incremented, or if video segmentation module 8 determines that the data at the new f cannot represent a natural continuation from the data points from $f_0$ up to and excluding f (e.g. by looking at shape changes and substantial position shifts). If the process terminates in this manner, then video segmentation module 8 defines a segment of this sequence as from $f_0$ to the previous value of f, with the interpolation function recently returned by interpolation function module 6.

In the manner described above, the collaborative workflow may define the segments in a sequence in succession, until all frames in the sequence are processed. The workflow may terminate as soon as the last frame is included in a segment, or optionally, restart using different parameters in the purpose of finding the best segmentation scheme in terms of data approximation accuracy, interpolation function simplicity, or other desirable property. The different parameters may include, for example, different decisions made solely by video segmentation module 8, such as whether to break a segment at points of movement jumps, shape changes, or movement trend changes.

An example technique implemented by interpolation function module 6 without collaboration with other modules of server device 2 is described in the following sample workflow. In this example technique, interpolation function module 6 may approximate an interpolation function, as accurately as possible for a segment defined by video segmentation module 8. In the example described below, interpolation function module 6 may determine the interpolation function using a simple implementation, which is based on the endpoints of the candidate segment supplied by video segmentation module 8.

Upon receiving the first frame $f_0$ with data $R(f_0)$, interpolation function module 6 may use the received data to define the shape type of the final interpolation function. In turn, interpolation function module 6 may return a function which always yields the data of this frame unmodified, i.e.

$$S(f_s: f_0 \ldots f_0) = R(f_0),$$

where '$f_s$' is the parameter of this function, but its range is limited to $f_0$. Upon receiving any subsequent frame f with data R(f), if R(f) does not represent the same shape type as $R(f_0)$, interpolation function module 6 may instruct video segmentation module 8 to terminate the segment at the previous frame that passed the described workflow.

Interpolation function module 6 may define the interpolation function $S(f_s)$ in the domain "$f_0 \ldots f$" ($f_0 \le f_s \le f$) such that the progress and all shape attributes are interpolated linearly. Interpolation function 6 may use only the data from $R(f_0)$ and R(f) for the determination, as follows:

$$S(f_s: f_0 \ldots f) = X(a_s, b_s, c_s, \ldots), \text{ where}$$

$$a_s = a_0 + (a - a_0)p,$$

$$b_s = b_0 + (b - b_0)p,$$

$$c_s = c_0 + (c - c_0)p,$$

etc., with $$p = \frac{f_s - f_0}{f - f_0},$$

and X, $a_0$, a, . . . matching $$R(f_0) = X(a_0, b_0, c_0, \ldots), R(f) = X(a, b, c, \ldots).$$

The term X may represent the shape name in $R(f_0)$, e.g., "Circle"; the terms a, b, c . . . may represent values of the shape attributes, such as the x coordinate, the y coordinate and the diameter of the circle.

For each frame $f_m$, where $f0 < f_m < f$, and where $R(f_m)$ is defined and not in a "gap" caused by skipping of frames, interpolation function module 6 may use the functions above to calculate the interpolated results of $a_s$, $b_s$, $c_s$ and so on, and compare the calculated values with the actual values at $R(f_m)$. If none of the differences exceed the error threshold, interpolation function module 6 may return function S defined above as the interpolation function. Otherwise, interpolation function module 6 may indicate to video segmentation module 8 to terminate the segment at the previous frame that passed this example workflow.

An example execution of this example workflow using the raw data in R defined above, is illustrated as follows. Assuming frames 100 to 119 have been processed and that the last generated interpolation function is:

$$S(f_s: 100 \ldots 119) = \text{Circle}(x = 0.3 + 0.19p, y = 0.2 + 0.19p, d = 0.1),$$

where $p = (f_s - 100)/19$.

In the above example, interpolation function module 6 may use the following endpoint data:

$$R(100) = \text{Circle}(x = 0.3, y = 0.2, d = 0.1);$$

$$R(119) = \text{Circle}(x = 0.49, y = 0.39, d = 0.1).$$

Video segmentation module 8 may indicate to interpolation function module 6 to include R(120)=Circle(x=0.6, y=0.4, d=0.1) in the interpolation function to be generated. In this instance, the per-frame increment of x is significantly greater (at 0.11) than previously (at 0.01). In turn, interpolation function module 6 may generate the following tentative function corresponding to frames 100 to 120:

$$S(f_s: 100 \ldots 120) = \text{Circle}(x=0.3+0.3p, y=0.2+0.2p, d=0.1),$$

where $p=(f_s-100)/20$.

When verifying frame 119, interpolation function module 6 may determine that S(119)=Circle(x=0.585, y=0.39, d=0.1), which in comparison with R(119)=Circle(x=0.49, y=0.39, d=0.1), x deviates by 0.095. If, for instance, the error tolerance is set at 0.05, interpolation function module 6 may determine that the candidate function covering frames 100 through 120 exceeds the threshold and should be rejected. As a result, in this example, interpolation function module 6 may indicate to video segmentation module to terminate the segment at frame 119, and starting a new segment at frame 120. In this example, the new segment may contain only frame 120, as frame 121 has an incompatible shape (square) with frame 120 (circle).

Mapping module 10 of server device 2 may be operable to associate particular portions of knowledge data 82 to particular objects identified by object identification module 4. As examples, knowledge data 82 may include filmography information for actors and voiceover artists, statistics for athletes, discographies for musicians, etc. In turn, as one example, mapping module 10 may associate a particular filmography to a particular actor. Additionally, mapping module 10 may store mapping information, such as associations between particular portions of knowledge data 82 and corresponding objects, to mapping data 84. In this manner, mapping module 10 may populate mapping data 84 with information that associates pertinent portions of knowledge data 82 to a corresponding object identified in a video by object identification module 4. Mapping module 10 may also map interpolation functions generated by interpolation function module 6 to corresponding objects, and store the information to mapping data 84.

In turn, server device 2 may transmit, via communication unit(s) 72, the video, an indication of each object identified in the video by object identification module 4, and an indication of each interpolation function generated by interpolation function module 6 to a client device. Additionally, server device 2 may transmit particular portions of knowledge data 82 and mapping data 84 to the client device. In this manner, server device 2 may implement one or more server-side techniques of this disclosure to supply pertinent information to a client device to provide interpolated video tagging. By supplying the pertinent information to the client device, server device 2 may enable the client device to provide a user with the interpolated video tagging experience even in situations where the client device is not actively connected to server device 2 for communication.

Figure 3:
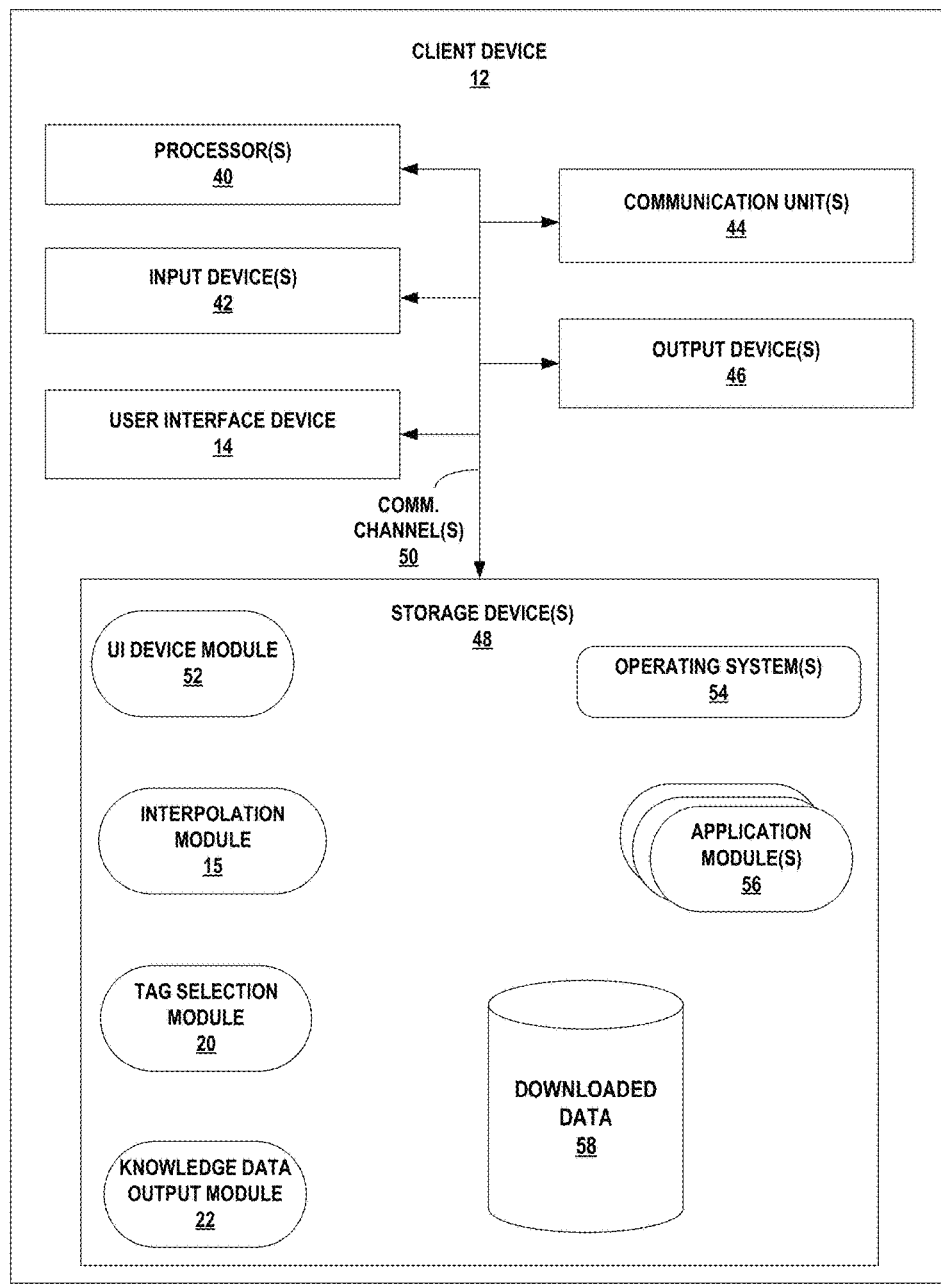
FIG. 3 is a block diagram illustrating details of a client device configured to perform one or more client-side interpolated video tagging techniques of this disclosure.

FIG. 3 is a block diagram illustrating details of client device 12 configured to perform one or more client-side interpolated video tagging techniques of this disclosure. Client device 12 may include, be, or be part of one or more of a variety of types of devices, such as a mobile phone (including a smartphone), tablet computer, netbook, laptop, desktop, personal digital assistant ("PDA"), set-top box, television, and watch, among others.

One or more processors 40 are, in various examples, configured to implement functionality and/or process instructions for execution within client device 12. For example, processors 40 may process stored on or otherwise accessible through storage device(s) 48. Such instructions may include components of one or more operating systems 54, object UI device module 52, interpolation module 15 and its components, tag selection module 20, and knowledge data output module 22.

Client device 12 may also include one or more communication units 44. Client device 12, in one example, utilizes communication unit(s) 44 to communicate with external devices via one or more networks, such as one or more wireless networks. Communication unit(s) 44 may include one or more of a network interface card, such as an Ethernet card, an optical transceiver, a radio frequency transceiver, or any other type of device that can send and receive information. Other examples of such communication units may include network interfaces such as Bluetooth®, 3G, 4G, and WiFi® radios in mobile host devices as well as universal serial bus (USB). In some examples, client device 12 utilizes communication unit(s) 44 to wirelessly communicate with external devices, such as one or more servers and/or host devices, over a network.

Input device(s) 42, in various examples, are configured to receive input from a user through tactile, audio, or video feedback. Examples of input device(s) 42 include a presence-sensitive display (such as a touchscreen), a mouse, a keyboard, a voice responsive system, video camera, microphone or any other type of device for detecting a command from a user. In some examples, a presence-sensitive display includes a touch-sensitive screen.

One or more output devices 46 may also be included in client device 12. Output device(s) 46, in some examples, are configured to provide output to a user using tactile, audio, or video stimuli. Output device(s) 46, in various examples, include a presence-sensitive display (e.g., a touchscreen), a sound card, a video graphics adapter card, or any other type of device for converting a signal into an appropriate form understandable to humans or machines. Additional examples of output device(s) 46 include a speaker, a cathode ray tube (CRT) monitor, a liquid crystal display (LCD), or any other type of device that can generate output that is intelligible to a user.

Each of components 40, 42, 44, 46, 14, and 48 may be interconnected (physically, communicatively, and/or operatively) for inter-component communications. In some examples, one or more communication channels 50 may include a system bus, network connection, inter-process communication data structure, or any other channel for communicating data. As one example in FIG. 3, components 40, 42, 44, 46, 14, and 48 may be coupled by one or more communication channels 50.

One or more operating systems 54 may control one or more functionalities of client device 12 and/or components thereof. For example, operating system(s) 54 may interact with one or more of UI device module 52, interpolation module 15, tag selection module 20, and knowledge data output module 22, and may facilitate one or more interactions between these modules and one or more of processor(s) 40 and communication unit(s) 44 via communication channel(s) 50. In some examples, one or more of UI device module 52, interpolation module 15, tag selection module 20, and knowledge data output module 22 may be included in operating system(s) 54. In other examples, one or more of UI device module 52, interpolation module 15, tag selection module 20, and knowledge data output module 22 may be implemented externally to client device 12, such as at a network location. In some such instances, client device 12 may use communication unit(s) 44 to access and implement functionalities provided by various modules illustrated with respect to client device 12 and their respective components, through methods commonly known as "cloud computing."

Client device 12 may also include application modules 56. Application modules 56 may be configured or otherwise operable to perform operations based on various conditions, such as detecting user input. As one example, one or more of application modules 12 may utilize UI device 14 to output UI 26 in various instances. Additionally, the relevant application module(s) 56 may receive user input, and generate output based on user input received by client device 12. Application modules 56 may also communicate the output to a user through various facilities provided by mobile client device 12, such as by displaying the output in a readable format via UI device 4 (e.g., within UI 26). Application modules 56 may, in various instances, implement functionalities provided by a manufacturer of client device 12 and/or functionalities provided by another party (often referred to as "third party applications").

Client device 12 may receive data, such as video, indications of objects represented in the video, interpolation functions, knowledge data, and mapping data from server device 2, such as via communication unit(s) 44. Additionally, client device may store the received information to downloaded data 58 of storage device(s) 48. In turn, various modules illustrated in FIG. 3 may access pertinent portions of downloaded data 58 in implementing the client-side interpolated video tagging techniques described herein.

For instance, interpolation module 15 may determine, from downloaded data 58, indications of various objects in the downloaded video, and interpolation functions associated with each such object. More specifically, each interpolation function may specify a time domain in which the respective interpolation function is valid. In other words, interpolation module 15 may determine particular segments, based on the specified time domain, that the object is continuously or substantially continuously represented in the video during the segment.

Additionally, interpolation module 15 may cause UI device module 52 to output the tag for display in conjunction with the corresponding frame of the segment. In one example, interpolation module 15 may embed the tag in the corresponding video frame, such that UI device module 52 outputs the tag in response to one or more conditions, such as a pause request received via input device(s) 42.

As described with respect to FIG. 1, tag selection module 20 may receive a selection of a tag that is displayed in conjunction with a current frame. More specifically, tag selection module 20 may receive a selection request via input device(s) 42, such as through a touch input provided at a touchscreen of input device(s) 42. Additionally, knowledge data output module 22 may, in response to the selection detected by tag selection module 20, cause UI device module 52 output pertinent knowledge data for the tagged object via output device(s) 46 and/or UI device 14.

By implementing the client-side interpolated video tagging techniques described above, client device 12 may provide a user experience that enables knowledge data access for tagged objects, while reducing computing resource consumption. More specifically, instead of storing shape, size and position data for a tag on a per-frame basis, client device 12 may implement the techniques to store the tag data with respect to the endpoints (or "boundaries") for segments of the video. Using received interpolation functions, client device 12 may apply the interpolation functions for a given object to determine how to display a tag for a given unit of time such as a frame. Instead of storing intermediate data points within a segment, client device 12 may dynamically estimate shape, size, and position data for a tag using the interpolation function and the techniques described herein.

Figure 4A:
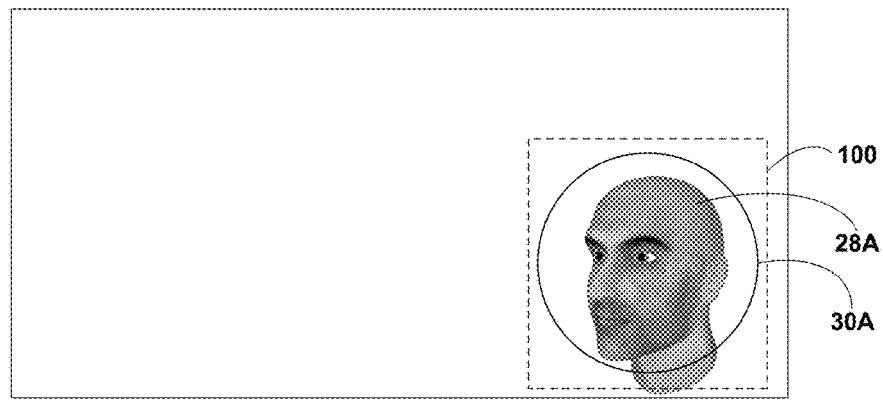
FIGS. 4A-4C are conceptual diagrams of user interfaces with interpolated video tags, in accordance with one or more aspects of this disclosure.
Figure 4B:
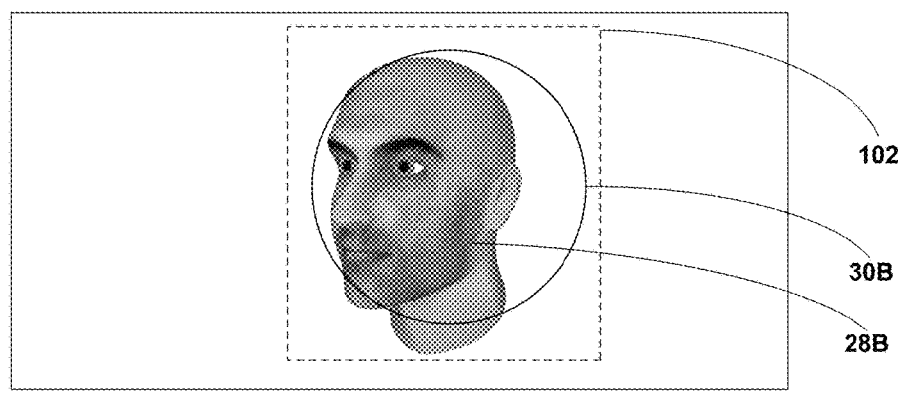
Figure 4C:
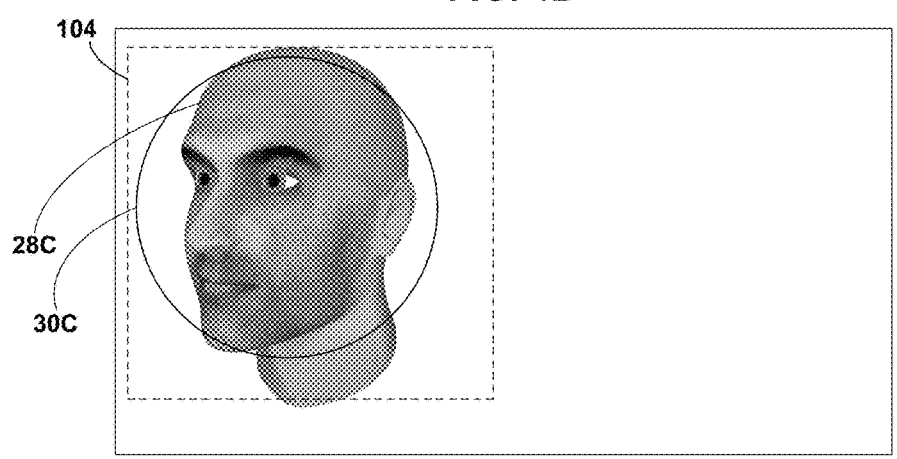

FIGS. 4A-4C are conceptual diagrams of user interfaces with interpolated video tags, in accordance with one or more aspects of this disclosure. More specifically, FIGS. 4A-4C illustrate three frames of a video segment that include varying representations of facial object 28 illustrated in FIG. 1. Additionally, FIGS. 4A-4C include varying representations of tag 30 illustrated in FIG. 1. The varying appearances of facial objects 28A-28C may result from the nature of the video segment, while the varying appearances of tags 30A-30C may result from application of an interpolation function, as determined by interpolation function module 6 of server device 2 with respect to the video segment. For purposes of example, FIGS. 4A-4C are described herein as representing the initial frame, an intermediate frame (e.g., positioned in the middle of the video segment), and the last frame of the video segment, respectively. Conceptually, the linear interpolation function can be thought of as a straight line roughly connecting the center of each of the objects in video frames of FIGS. 4A-4C. Additionally, this conceptual expression may be extended to a greater number of representations of the facial object, such as an endpoint-to-endpoint progression of the facial object across a segment of the video. Also for purposes of example, FIGS. 4A-4C are described herein with respect to the devices and components illustrated in FIGS. 1-3.

FIG. 4A illustrates first facial object 28A positioned at first position 100, and a first tag 30A. Interpolation module 15 computes tag 30B based on the received interpolation function and displays tag 30B associated with facial object 28B.

FIG. 4B illustrates second facial object 28B at second position 102, which is positioned substantially to the left of first position 100, indicating linear movement of facial object 28 along a horizontal axis. Additionally, second facial object 28B may be larger than first facial object 28A, indicating movement of the face toward an image capture device. Based on the received interpolation function, interpolation module 15 computes tag 30B and displays tag 30B associated with facial object 28B.

As shown, the placement of second tag 30B may be skewed to the right of second facial object 28B, when compared to the placement of first tag 30A with respect to first facial object 28A. For instance, leftward portions of second facial object 28B, such as the chin, may not be included in second tag 30B. Additionally, second tag 30B may include substantial portions of the current frame that do not represent second facial object 28B, positioned to the left of second facial object 28B. Such inaccuracies may result from interpolation module 15 computing a position for the tag using an interpolation function, rather than storing exact tag position data on a per-frame basis. However, such inaccuracies may be tolerable in the context of reduced computing resource consumption provided by the interpolated video tagging techniques described herein.

FIG. 4C illustrates third facial object 28C at third position 104. Interpolation module 15 computes tag 30B based on the received interpolation function and displays tag 30B associated with facial object 28B. As shown, third position 104 may be positioned substantially to the left and upward of second position 102 within a frame, indicating linear movement of facial object 28 along both horizontal and vertical axes. Additionally, third facial object 28C may be larger than second facial object 28B, indicating further movement of facial object 28 toward the image capture device.

On client device 12, by applying the interpolation function calculated by interpolation function module 6 with respect to a particular frame of a video segment, interpolation module 15 may determine a shape, position, and size of a tag to display in conjunction with the particular frame or other unit of time. In the examples described with respect to a facial object for which interpolation module 15 determines a circular shape, interpolation module 15 may determine attributes of a circular tag to display in conjunction with the particular frame. More specifically, interpolation module 15 may determine the position, shape, and size of the tag based on the received interpolation function. Interpolation module 15 may be configured to interpret interpolation functions that are expressed as two endpoints as linear functions between the endpoints.

Figure 5:
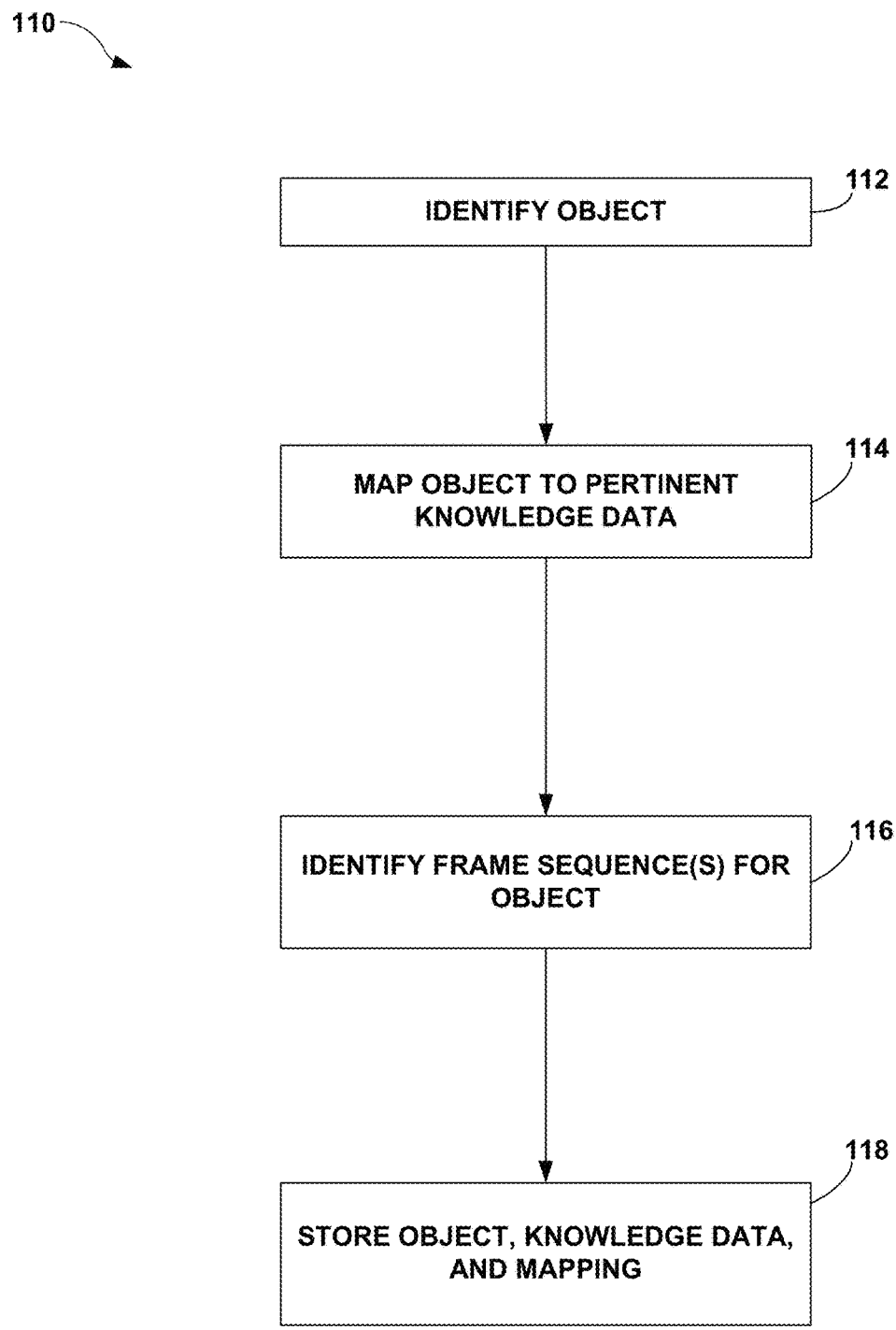
FIG. 5 is a flowchart illustrating an example process by which a server device may implement one or more server-side interpolated video tagging techniques of this disclosure.

FIG. 5 is a flowchart illustrating an example process 110 by which a server device may implement one or more server-side interpolated video tagging techniques of this disclosure. For purposes of example only, process 110 is described with respect to server device 2 of FIGS. 1-2. Process 110 may begin object identification module 4 identifies one or more objects in a video (112). As described, object identification module 4 may identify various types of objects including visual representations of persons (e.g., actors or athletes), geographic locations, audio objects such as songs and voiceovers, buildings, and others. Additionally, mapping module 10 may map knowledge data, such information available from various Internet websites, to each object identified by object identification module 4 (114). In examples, video segmentation module 8 may determine raw tag data, such as frame-by-frame information on the existence of one or more of the objects identified by object identification module 4 in the video.

In some implementations, components of server device 2 may split representations of the identified objects into virtual objects with non-overlapping appearances. More specifically, video segmentation module 8 may determine one or more continuous appearances, or continuous time ranges, through which an identified object appears in the video. In examples, a continuous appearance may be limited to a single time instance, such as a single frame without any neighboring frames in which the object appears. The definition of an appearance of an object as identified by object identification module 4 may be abstract, such as for audio data that may not be represented visually in any frames, or for geographic locations.

Additionally, object identification module 4 may identify overlapping appearances of the same object in a frame, such as a 4×4 television wall with each block displaying the same person, an actor visually represented on-screen who also performs a narration, a person and a portrait of the person appearing in the same frame, and others. Object identification module 4 may also identify virtual objects as "copies" of the object that may serve as a distinction between multiple instances of the same object. Video segmentation module 8 and interpolation function module 6 may generate segment and interpolation data for each identified copy of an object.

Video segmentation module 8 may determine one or more frame sequences, or segments, for each object identified by object identification module 4 in the video. Additionally, server device 2 may store indications of each object, data indicating the segments, knowledge data 82 that is pertinent to each identified object, and mapping data 84 linking pertinent knowledge data 82 to corresponding objects, to storage device(s) 78. In this manner, server device 2 may implement one or more server-side techniques of this disclosure to enable a client device to provide an interpolated video tagging user experience while conserving computing resources.

Figure 6:
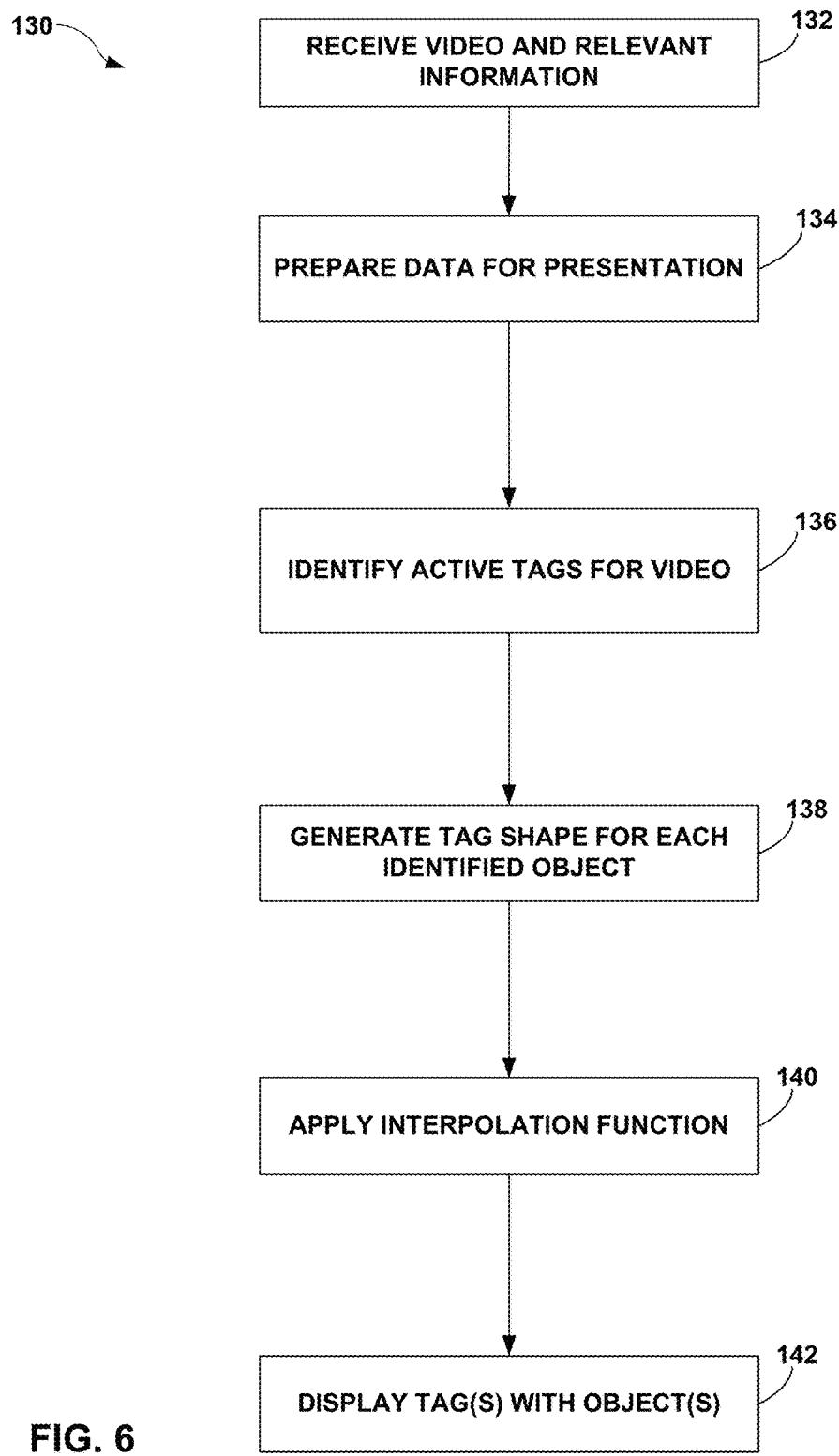
FIG. 6 is a flowchart illustrating an example process by which a client device may implement one or more client-side interpolated video tagging techniques of this disclosure.

FIG. 6 is a flowchart illustrating an example process 130 by which a client device may implement one or more client-side interpolated video tagging techniques of this disclosure. For purposes of example, process 130 is described herein with respect to client device 12 of FIGS. 1 and 3, and components thereof. Process 130 may begin when client device 12 receives, via communication unit(s) 44, a video and relevant information, such as indications of objects, segment endpoint data, relevant knowledge data, mapping data, and interpolation functions from server device 2 (312). In some scenarios, client device 12 may receive the video and data as a download, e.g., by saving the received data as files to storage device(s) 48. In other scenarios, client device 12 may "stream" the video and data, such as by receiving portions of the video and data on an ongoing basis, for output via output device(s) 46.

Client device 12 may prepare the received video and data for presentation (134). For instance, client device 12 may actively load one or more parts of the received data (e.g., files) that are relevant to time ranges of the video that are currently output for display. In examples, client device 12 may load parts or portions of received files in installments, each installment being a stand-alone unit covering a specific time range of the video. By loading the received files in installments, client device 12 may eliminate the need to load an entire file, further reducing consumption of memory portions of storage device(s) 48 that would otherwise be needed for file data.

Interpolation module 15 may identify tags for the received video (136). In examples, interpolation module 15 may identify all "active" tags for a specific time, or time range, of the video. More specifically, an active tag may be associated with an indicated object that is represented at the specific time or time range of the video. In examples, interpolation module 15 may identify the specific time based on a user input, such as a pause request. Additionally, interpolation module 15 may determine that one or more tags are active with respect to the specific time (e.g., still frame identified by the pause request), based on indications of objects represented at the specific time. In some examples, the interpolation module 15 identifies the active tags by determining which interpolation functions are defined as valid for the particular time.

Additionally, interpolation module 15 may generate a tag shape for each identified object (138). For instance, interpolation module 15 may associate certain predetermined shapes with object types, such as circular tags with facial objects, such as by looking up an object type in a database that associates object types with tag shapes. As another example, interpolation module 15 may generate a particular shape, such as a custom polygon, for certain object types, such as a building. In still other examples, interpolation module 15 may determine a binary present/absent criterion, such as with respect to audio objects. In some examples, interpolation module 15 generates the tag shape based on the interpolation function associated with the object.

Interpolation module 15 may apply each received interpolation function to each corresponding video segment and identified object (140). By applying the interpolation function, interpolation module 15 may determine the position and size of each object in each frame of the sequence. Additionally, UI device module 52 may output, for display, each tag generated by interpolation module 15 with each identified object, in each corresponding frame (or segment) of the received video (142).

Figure 7:
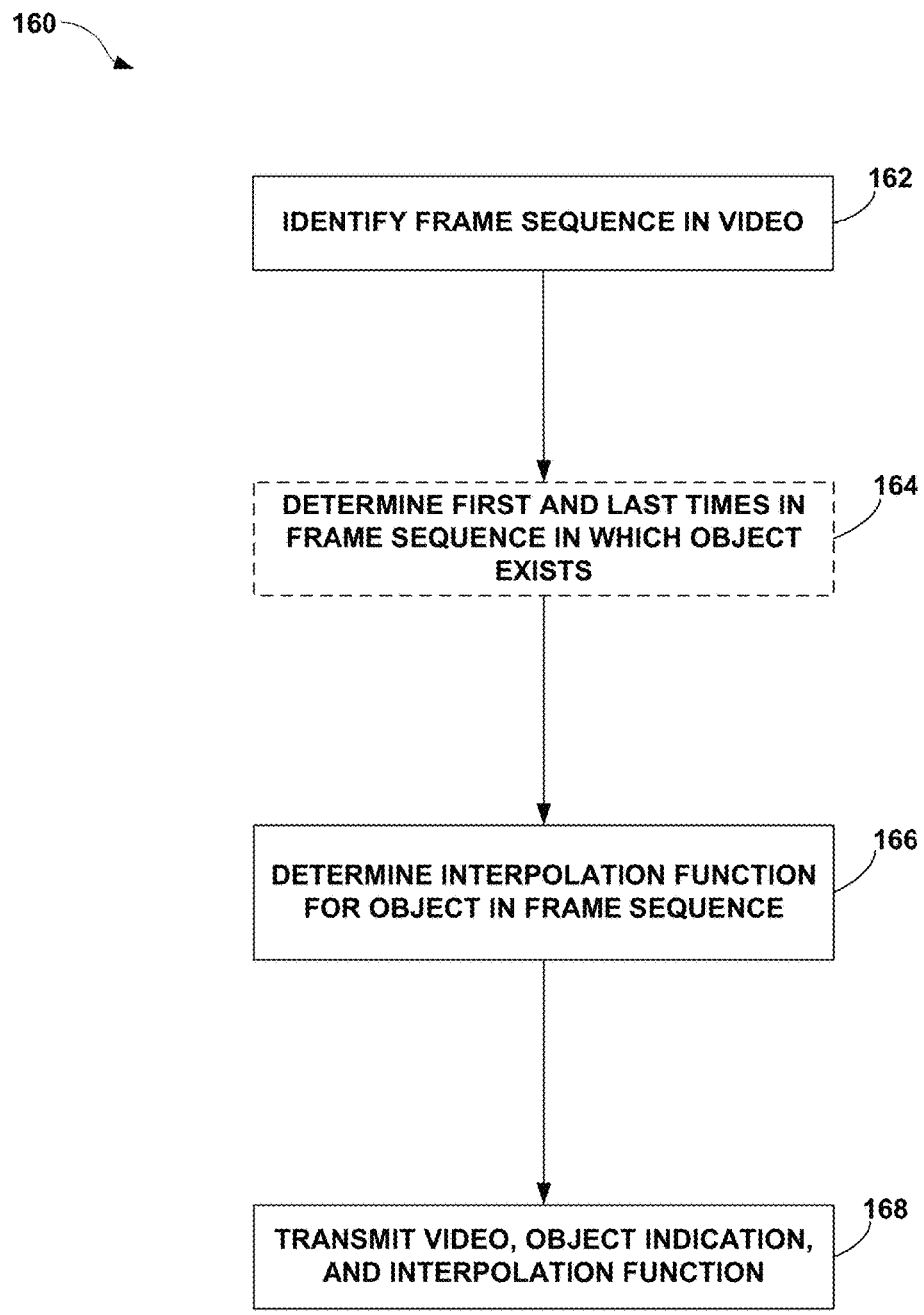
FIG. 7 is a flowchart illustrating another example process by which a server device may implement one or more server-side interpolated video tagging techniques of this disclosure.

FIG. 7 is a flowchart illustrating another example process 160 by which a server device may implement one or more server-side interpolated video tagging techniques of this disclosure. Although process 160 may be performed by a variety of devices, for purposes of explanation only, process 160 is described herein with respect to server device 2 of FIGS. 1-2, and various components thereof. Process 160 may begin when video segmentation module 8 identifies a frame sequence in a video (162). For instance, video segmentation module 8 may identify a sequence of video frames included in a plurality of video frames of the video. In examples, all or a portion of the video frames of the sequence may include a representation of an object identified by object identification module 4.

In some examples, video segmentation module 8 may determine the first and last times in the frame sequence in which the object exists (164). As indicated by dashed-line borders, (164) may form an optional operation. In other examples, video segmentation module 8 may determine the existence of the object using a midpoint frame, or using other techniques described herein. As examples, video segmentation module 8 may determine timestamps and/or frame counts associated with the first and last times in the frame sequence that an object identified by object identification module 4 exists.

Additionally or alternatively, interpolation function module 6 may determine an interpolation function for the object in the frame sequence (166). For instance, interpolation function module 6 may determine an interpolation function associated with an existence of the object in the sequence of video frames the sequence at which it is determined that the object exists, where the interpolation function specifies a time domain of the video in which the interpolation function is valid. In some examples, interpolation function module 6 may not determine a first and last time in the frame sequence at which the object exists as an operation separate from determining the interpolation function, but instead the time domain may be ascertained as part of the process of determining the interpolation function. Additionally, one or more of communication units 72 may transmit the video, an indication of the object, and an indication of the interpolation function (168).

Figure 8:
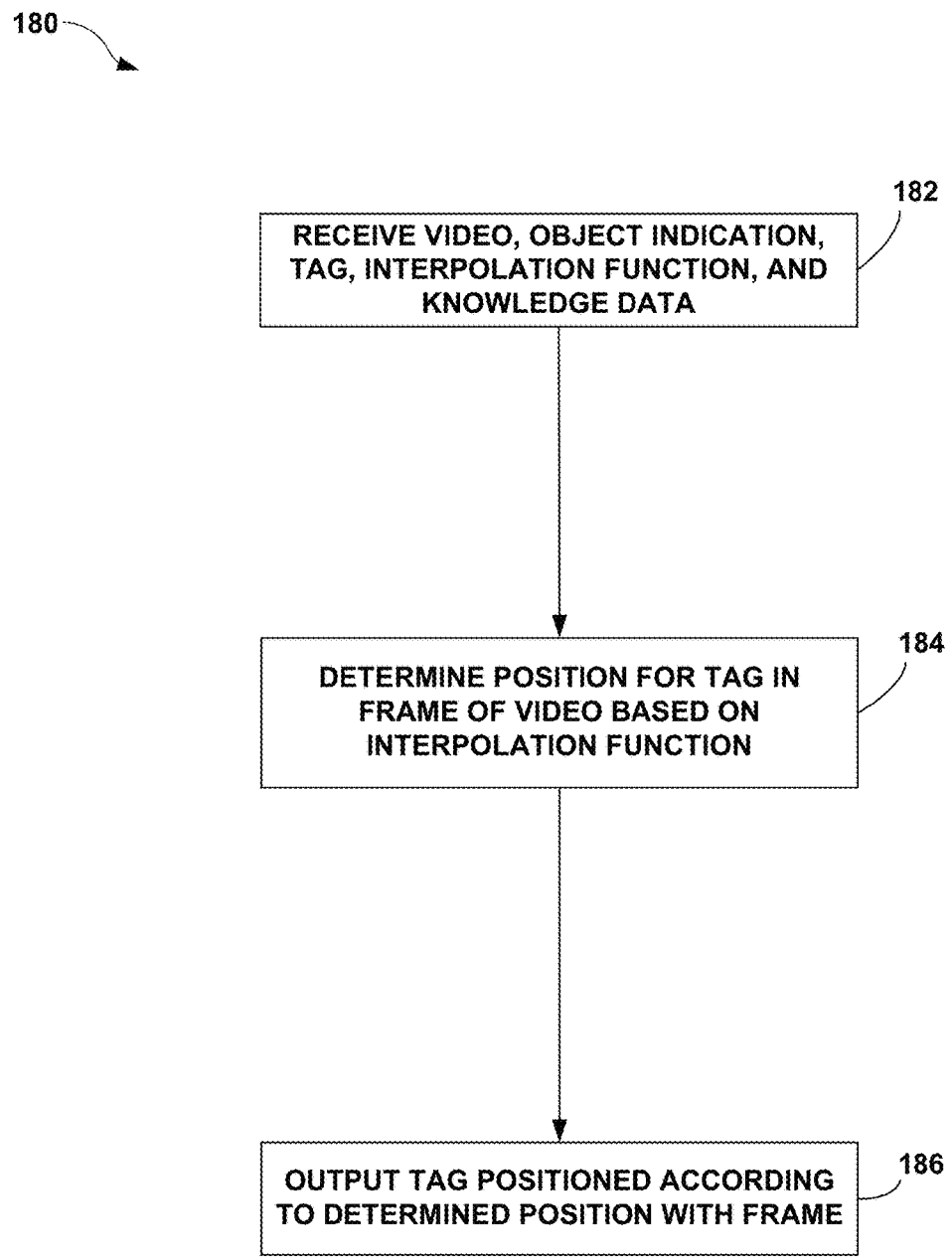
FIG. 8 is a flowchart illustrating another example process by which a client device may implement one or more client-side interpolated video tagging techniques of this disclosure.

FIG. 8 is a flowchart illustrating another example process 180 by which a client device may implement one or more client-side interpolated video tagging techniques of this disclosure. For purposes of example, process 180 is described herein with respect to client device 12 of FIGS. 1 and 3, and various components thereof. Client device 12 may receive, using communication unit(s) 44, a video, and indications of one or more objects, one or more interpolation functions associated with each object, and knowledge data associated with each object (182). The received video may include a plurality of video frames, and the interpolation function may specify a time domain of the video in which the interpolation function is valid.

Interpolation module 15 may determine a position for a tag in a video frame of the video, based on the interpolation function (184). The tag may be associated with the knowledge data associated with a corresponding object. Additionally, UI device module 52 may output the tag for display, positioned according to the position determined by interpolation module 15 with respect to a particular frame (186).

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium or computer-readable storage device encoded with instructions. Instructions embedded or encoded in an article of manufacture including an encoded computer-readable storage medium or computer-readable storage device, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise a tangible or non-transitory media, such as one or more computer-readable storage devices. The term "non-transitory" may indicate that the storage medium is not embodied in a carrier wave or a propagated signal. In certain examples, a non-transitory storage medium or non-transitory computer-readable storage device may store data that can, over time, change (for example, in RAM or cache).

Various aspects of the disclosure have been described. Aspects or features of examples described herein may be combined with any other aspect or feature described in another example. These and other examples are within the scope of the following claims.

What is claimed is:

1. A method comprising:
   receiving, by a first computing device and from a second computing device separate from the first computing device, a video that includes a plurality of video frames, an indication of at least one object represented in the video, an indication of an interpolation function associated with the object for at least one sequence of video frames of the video, wherein the interpolation function specifies a time domain of the video in which the interpolation function is valid;

determining, by the first computing device and for a video frame of the video and based on the interpolation function, values for one or more dimensions of a tag associated with the object, a tag shape for the tag, and a position in the video frame at which to display the tag, wherein determining the tag shape comprises determining an object type specified by the interpolation function and determining, based on the object type and a data structure mapping object types to tag shapes, the tag shape; and outputting for display, by the first computing device, the tag having the determined tag shape, sized according to the determined values, and positioned in the video frame according to the determined position.

2. The method of claim 1, wherein the interpolation function expresses the one or more dimensions of the tag associated with the object as a function of time in the video.

3. The method of claim 1, wherein the interpolation function expresses how a position in a video frame at which to display the tag associated with the object changes as a function of time in the video.

4. The method of claim 1, wherein the time domain in which the interpolation function is valid includes two or more non-contiguous time segments of the video.

5. The method of claim 1, wherein the time domain specified by the interpolation function is associated with a sequence of video frames included in the plurality of video frames of the video.

6. The method of claim 5, further comprising receiving an indication of a second object represented in the video, an indication of a second interpolation function associated with the second object for at least a second sequence of video frames of the video, wherein the second interpolation function specifies a second time domain of the video in which the second interpolation function is valid.

7. The method of claim 1, wherein the video frame is a first video frame included in the sequence of video frames and the determined values for the one or more dimensions and position for the tag are first values and a first position for the tag, the method further comprising:

determining, by the first computing device and for a second video frame of the sequence of video frames, second values for the one or more dimensions and a second position in the video frame for the tag associated with the object; and outputting for display, by the first computing device, the tag sized and positioned according to the second values and the second position in association with the second video frame of the sequence of video frames.

8. The method of claim 1, further comprising:

receiving, by the first computing device and from the second computing device, knowledge data associated with the object;

receiving, by the first computing device, a user input indicating a selection of the tag that is output for display in association with the determined video frame; and responsive to receiving the user input, outputting, by the first computing device, at least a portion of the knowledge data associated with the object.

9. The method of claim 8, wherein outputting at least the portion of the knowledge data comprises:

outputting, by the first computing device, at least the portion of the knowledge data for display in association with the determined video frame.

10. The method of claim 1, wherein outputting the tag for display is responsive to receiving one or more inputs.

11. The method of claim 10, wherein the one or more inputs include at least one of a pause request associated with the determined video frame and an object selection associated with the determined video frame.

12. The method of claim 1, wherein the object comprises a representation of at least one of a face, a body, and an inanimate entity.

13. The method of claim 12, wherein the inanimate entity comprises an entity selected from a group consisting of a building, a geographic location, and audio data, the audio data comprising at least one of a song or a voiceover.

14. A device comprising:
a memory;
an interface configured to receive, from a second computing device separate from the device, a video that includes a plurality of video frames, an indication of at least one object represented in the video, an indication of an interpolation function associated with the object for at least one sequence of video frames of the video, wherein the interpolation function specifies a time domain of the video in which the interpolation function is valid; and
one or more programmable processors configured to:
determine, for a video frame of the video and based on the interpolation function, value for one or more dimensions of a tag associated with the object, a tag shape for the tag, and a position in the video frame at which to display the tag, wherein determining the tag shape comprises determining an object type specified by the interpolation function and determining, based on the object type and a data structure mapping object types to tag shapes, the tag shape; and
output, for display, the tag having the determined tag shape, sized according to the determined values, and positioned in the video frame according to the determined position.

15. A non-transitory computer-readable storage device encoded with instructions that, when executed, cause one or more programmable processors of a first computing device to:
receive, from a second computing device separate from the first computing device, a video that includes a plurality of video frames, an indication of at least one object represented in the video, an indication of an interpolation function associated with the object for at least one sequence of video frames of the video, wherein the interpolation function specifies a time domain of the video in which the interpolation function is valid;
determine, for a video frame of the video and based on the interpolation function, values for one or more dimensions of a tag associated with the object, a tag shape for the tag, and a position in the video frame at which to display, wherein determining the tag shape comprises determining an object type specified by the interpolation function and determining, based on the object type and a data structure mapping object types to tag shapes, the tag shape; and output, for display, the tag having the determined tag shape, sized according to the determined values, and positioned in the video frame according to the determined position.

16. The method of claim 1, wherein the one or more dimensions of the tag comprises one or more dimensions selected from a group consisting of a width of the tag, a height of the tag, an x-coordinate position of the tag, a y-coordinate position of the tag, a diameter of the tag, and a radius of the tag.

17. The method of claim 1, wherein the object comprises a song object, and wherein the interpolation function associated with the song object indicates existence of the song object as a function of time in the video.

18. The method of claim 17, further comprising:
determining, by the computing device, a position in the video frame at which to display the tag for the song object such that the tag does not overlap with any other tag being displayed in the video frame.

* * * * *